(12) United States Patent
Kriese et al.

(10) Patent No.: US 7,877,932 B2
(45) Date of Patent: Feb. 1, 2011

(54) ADJUSTING SYSTEM FOR A MOTOR VEHICLE DOOR

(75) Inventors: Olaf Kriese, Lautertal (DE); Patricica Cruz, Bamberg (DE); Hilmar Dohles, Itzgrund (DE); Rolf Bücker, Bamberg (DE); Ronny Schreiber, Floh-Seligenthal (DE); Manfred Stenzel, Bamberg (DE); Harald Krüger, Erlangen (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 749 days.

(21) Appl. No.: 11/667,257

(22) PCT Filed: Dec. 29, 2005

(86) PCT No.: PCT/DE2005/002338

§ 371 (c)(1),
(2), (4) Date: May 7, 2007

(87) PCT Pub. No.: WO2006/074632

PCT Pub. Date: Jul. 20, 2006

(65) Prior Publication Data

US 2007/0271849 A1   Nov. 29, 2007

(30) Foreign Application Priority Data

Jan. 14, 2005 (DE) .................. 10 2005 001 776
Jan. 14, 2005 (DE) .................. 20 2005 000 537 U
May 26, 2005 (DE) .................. 10 2005 025 087

(51) Int. Cl.
*E05F 11/48* (2006.01)

(52) U.S. Cl. .................. 49/352; 49/348; 49/349; 49/502; 49/503

(58) Field of Classification Search .......... 49/348, 49/349, 352, 502, 503
See application file for complete search history.

(56) References Cited

U.S. PATENT DOCUMENTS 4,381,625 A * 5/1983 Andrei-Alexandru et al. . 49/280

(Continued)

FOREIGN PATENT DOCUMENTS

DE         195 26 451 C1        9/1996

(Continued)

OTHER PUBLICATIONS

English translation of International Preliminary Report on Patentability dated Jul. 24, 2007, corresponding to PCT/DE2005/002338.

(Continued)

*Primary Examiner*—Jerry Redman
(74) *Attorney, Agent, or Firm*—Christie, Parker & Hale LLP

(57) ABSTRACT

An adjusting system for a motor vehicle door includes a window winder for adjusting a window, at least one guide area of the window winder for guiding the window along a direction of adjustment, a door lock and a lock support. The one guide area of the window winder and the lock support are fixedly connected to one another, such that the guide area and the lock support form a structural unit. The guide area which is combined with the lock support into a structural unit includes at least one overlap area for a lateral window edge of the window to be adjusted and a further guide area of the window winder is provided, which is extended in the direction of adjustment of the window, and is positively engaged with a carrier being forcibly guided along the direction of adjustment of the window to be adjusted.

60 Claims, 17 Drawing Sheets

U.S. PATENT DOCUMENTS

| | | | | |
|---|---|---|---|---|
| 4,831,710 A * | 5/1989 | Katoh et al. | | 29/434 |
| 4,905,412 A * | 3/1990 | Srock et al. | | 49/352 |
| 4,934,099 A * | 6/1990 | Maekawa et al. | | 49/352 |
| 5,050,347 A * | 9/1991 | Brusasco | | 49/348 |
| 5,050,350 A * | 9/1991 | Bertolini et al. | | 49/502 |
| 5,062,240 A * | 11/1991 | Brusasco | | 49/348 |
| 5,095,659 A * | 3/1992 | Benoit et al. | | 49/502 |
| 5,226,259 A * | 7/1993 | Yamagata et al. | | 49/502 |
| 5,505,024 A * | 4/1996 | DeRees et al. | | 49/503 |
| 5,555,677 A * | 9/1996 | DeRees et al. | | 49/502 |
| 5,581,952 A * | 12/1996 | Kapes et al. | | 49/502 |
| 5,855,096 A * | 1/1999 | Staser et al. | | 49/503 |
| 5,902,004 A * | 5/1999 | Waltz et al. | | 296/146.9 |
| 5,904,002 A * | 5/1999 | Emerling et al. | | 49/502 |
| 5,960,588 A * | 10/1999 | Wurm et al. | | 49/352 |
| 5,964,063 A * | 10/1999 | Hisano et al. | | 49/502 |
| 6,076,882 A * | 6/2000 | Szerdahelyi et al. | | 296/146.1 |
| 6,134,840 A * | 10/2000 | Pleiss | | 49/502 |
| 6,185,872 B1 * | 2/2001 | Seeberger et al. | | 49/502 |
| 6,192,632 B1 * | 2/2001 | Medebach et al. | | 49/502 |
| 6,233,875 B1 * | 5/2001 | Carlo et al. | | 49/502 |
| 6,354,652 B1 * | 3/2002 | Arquevaux et al. | | 296/146.5 |
| 6,397,524 B1 * | 6/2002 | Sakaguchi et al. | | 49/375 |
| 6,438,899 B1 * | 8/2002 | Feder et al. | | 49/502 |
| 6,546,674 B1 * | 4/2003 | Emerling et al. | | 49/502 |
| 6,640,500 B1 * | 11/2003 | Stout | | 49/502 |
| 6,766,618 B2 * | 7/2004 | Cardine et al. | | 49/502 |
| 6,931,791 B1 * | 8/2005 | Pleiss | | 49/502 |
| 7,100,326 B2 * | 9/2006 | Shimada et al. | | 49/360 |
| 7,111,893 B2 * | 9/2006 | Carter et al. | | 296/146.1 |
| 7,228,610 B2 * | 6/2007 | Carter et al. | | 29/428 |
| 7,347,026 B1 * | 3/2008 | Martin et al. | | 49/502 |
| 7,490,438 B1 * | 2/2009 | Maass et al. | | 49/502 |
| 2003/0159357 A1 * | 8/2003 | Sakaguchi et al. | | 49/352 |
| 2004/0128917 A1 * | 7/2004 | Lin et al. | | 49/502 |
| 2005/0115155 A1 * | 6/2005 | Ottino et al. | | 49/502 |
| 2007/0056219 A1 * | 3/2007 | Martinez Morai et al. | | 49/502 |
| 2007/0251149 A1 * | 11/2007 | Kirejczyk et al. | | 49/352 |
| 2007/0271849 A1 * | 11/2007 | Kriese et al. | | 49/348 |
| 2008/0276541 A1 * | 11/2008 | Roy et al. | | 49/502 |
| 2009/0145035 A1 * | 6/2009 | Mangold et al. | | 49/352 |

FOREIGN PATENT DOCUMENTS

| | | |
|---|---|---|
| DE | 197 01 378 A1 | 11/1997 |
| DE | 100 57 352 A1 | 5/2002 |
| DE | 202 18 679 U1 | 5/2004 |
| WO | WO 01/07277 A1 | 2/2001 |

OTHER PUBLICATIONS

International Search Report, dated May 15, 2006, Corresponding to PCT/DE2005/002338.

* cited by examiner

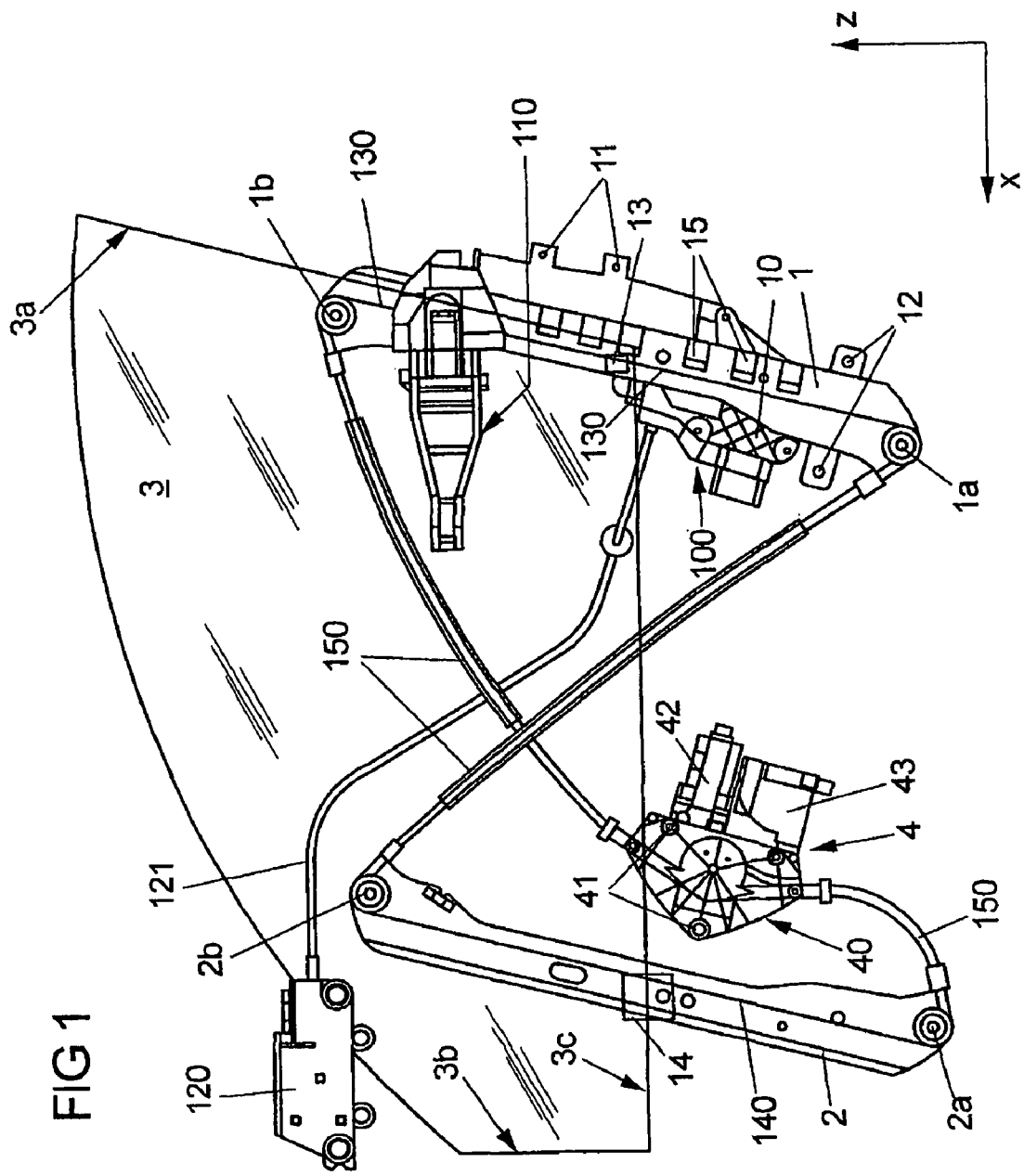
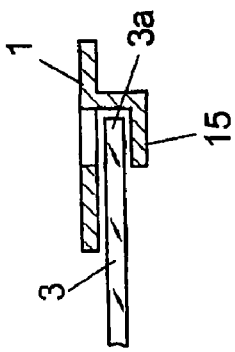
FIG 1
FIG 1A

FIG 4A
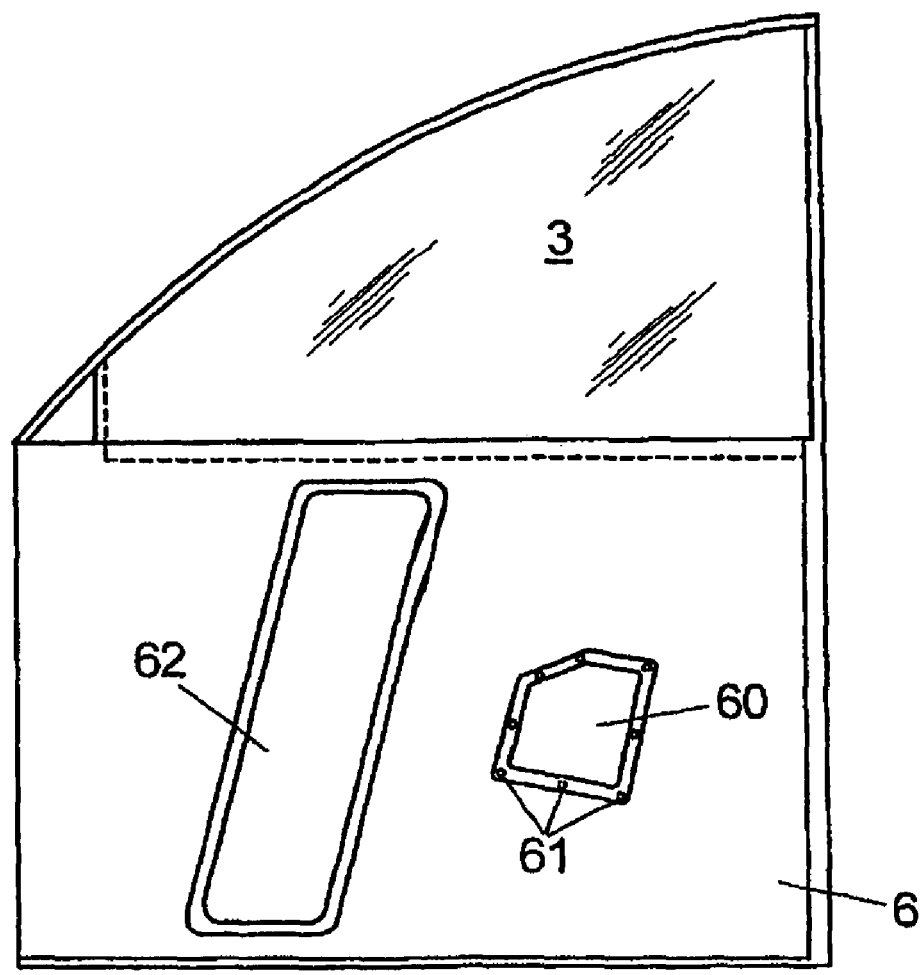
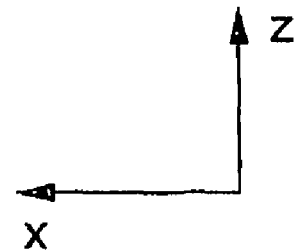

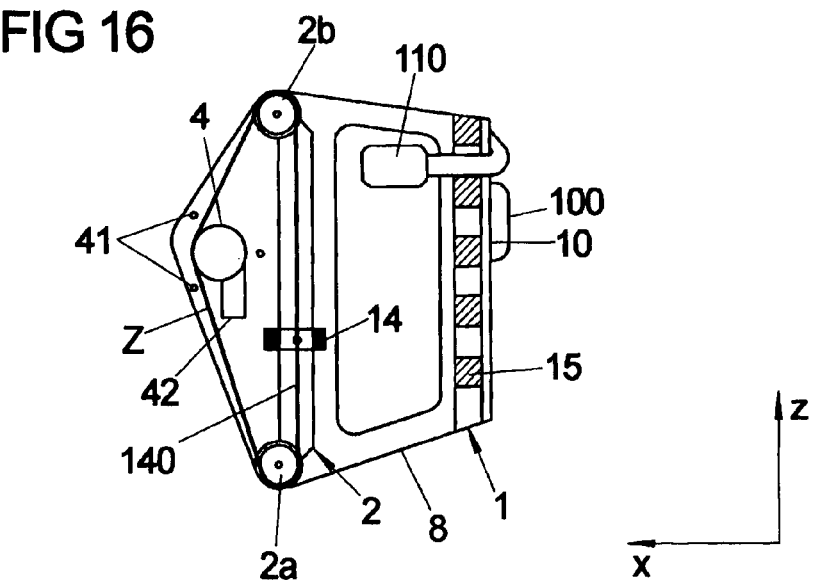
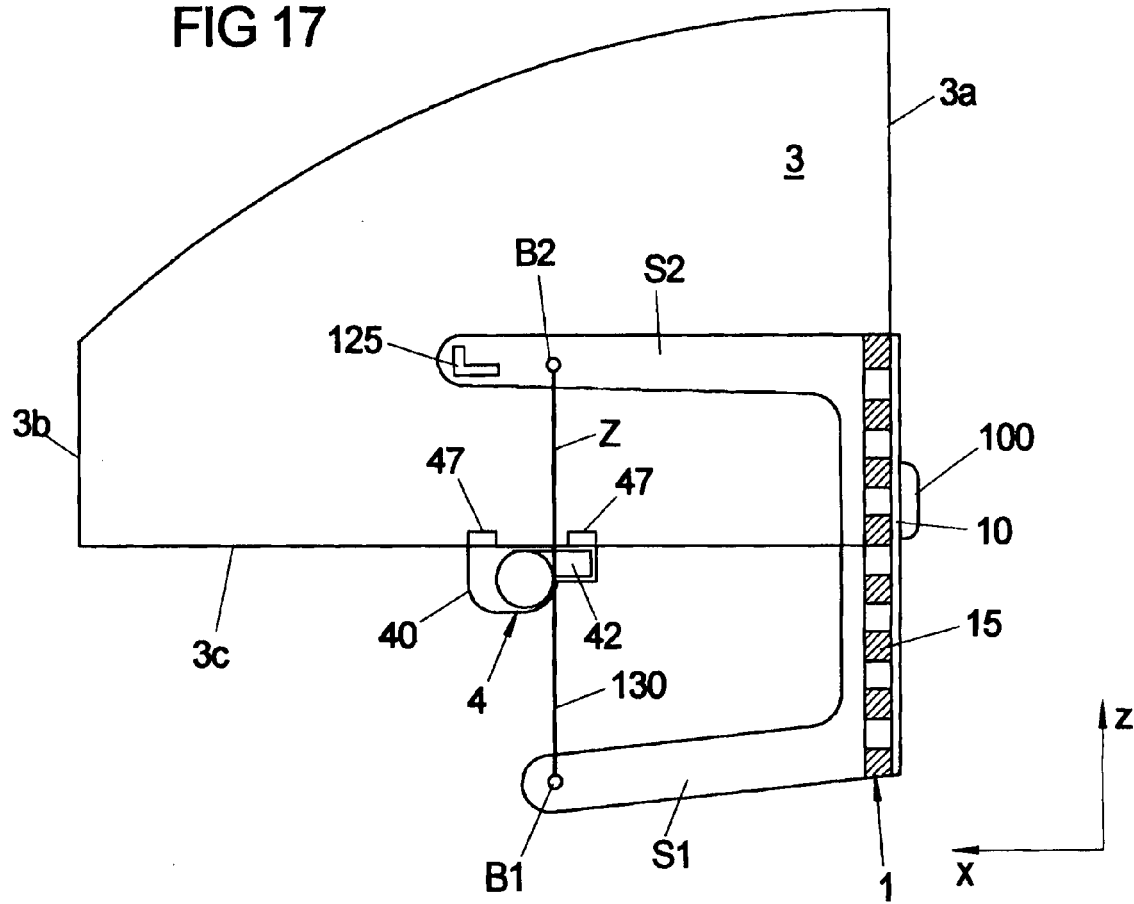

FIG 18
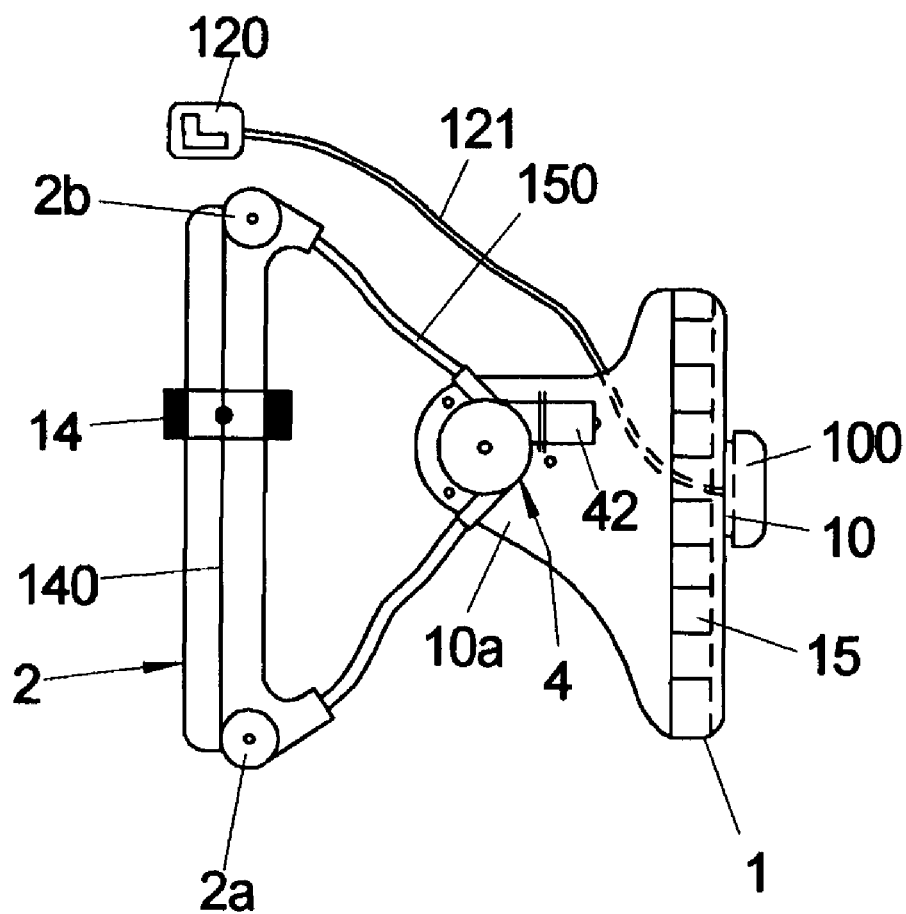
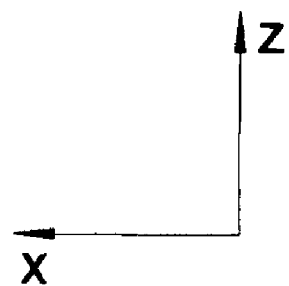

ADJUSTING SYSTEM FOR A MOTOR VEHICLE DOOR

CROSS-REFERENCE TO A RELATED APPLICATION

This application is a National Phase Patent Application of International Patent Application Number PCT/DE2005/002338, filed on Dec. 29, 2005, which claims priority of German Utility Model Application Number 20 2005 000 537.1, filed on Jan. 14, 2005, German Patent Application Number 10 2005 001 776.2, filed on Jan. 14, 2005, and German Patent Application Number 10 2005 025 087.4, filed on May 26, 2005.

BACKGROUND

The invention relates to an adjusting system for a motor vehicle door.

Such an adjusting system comprises a (single-strand or multiple-strand) window winder for adjusting a window of the motor vehicle door, which has at least one (flexible or rigid) force transmitting element extended in the direction of adjustment of the window and which extends along the or each strand of the window winder and is coupled to an adjusting drive. In this connection, it may be, for example, a flexible force transmitting element in the form of a cable or a flexible element of screw-shaped configuration or a rigid force transmitting element in the form of a toothed rack or a spindle. The window winder further comprises a guide area for guiding the window to be adjusted in the direction of adjustment which, for example, may be configured as a guide rail and along which a force transmitting element of the disclosed type may extend. Moreover, the adjusting system comprises a door lock and a lock support for receiving and pre-assembling the door lock—already carried out outside the motor vehicle door.

A combined drive unit for an assembly, for example a window winder and for a door lock, is known from DE 202 18 679 U1, a switching unit being provided for the window winder or the door lock to be selectively impinged upon by the drive force. The activation of the switching unit is carried out by the door actuating lever. When the door handle is actuated, the drive force is conveyed from the switching unit to the door lock. The window winder may only be operated if the door handle remains unactuated. According to an embodiment of this technical teaching, a single-strand cable window winder is provided, the cable loop thereof being connected to a drive which, in turn, is mounted on the housing of the door lock. The separate guide rail of the cable window winder carries cable deflection elements (for example cable pulleys) at the ends and—before the installation of the combined drive system—is flexibly connected to the door lock via the cable loop.

SUMMARY

The problem of the invention is to improve an adjusting system of the aforementioned type, in particular to increase the level of integration thereof.

According to the invention, the adjusting system comprising a window winder is constructed such that the lock support is rigidly connected to the guide area on the lock side directly into a structural and functional unit. Thus, it is possible to make a stationary area of the lock support, belonging to the locking system, into the functional component of the window winder. Or in other words: the lock support and the guide area on the lock side of the window winder form a structural unit and, to this end, are preferably connected directly to one another.

Advantageously, the structural unit made up of the lock support and the guide area on the lock side are configured in the form of an integral plastics injection-molded part or a light metal casting, in order to reduce assembly costs. Furthermore, it is advantageous to integrate into the structural unit, made up of the lock support and the guide area on the lock side, a portion of the lock housing, of the drive housing for the window winder drive and/or of the housing for an electronic control unit.

Moreover, further additional functional elements or systems may be added to or incorporated in the guide area on the lock side. For example, the following parts thereof are named: external door handle holder, a cover or the like for the lock for protection against manipulation of the lock, means for guiding the adjacent lateral window edge of the window to be adjusted, electrical conductors for the power supply and/or for signal transmission, and elements for the control of water, i.e. for the treatment of moisture and damp penetrating a motor vehicle door.

In particular in the case of a double-strand window winder in the form of a cable window winder, it may be advantageous for reducing the transport volume and for simplifying handling, if the structural unit consisting of the lock support and the guide area on the lock side carries or incorporates additional fixing elements which are suitable for fastening the second guide area to the aforementioned structural unit. Such a 'folding up' of the double-strand cable window winder for transportation is easily facilitated by flexible Bowden cables between the two guide areas.

It is additionally proposed to fasten the internal opener and the drive unit of the window winder temporarily to the first or second guide area via suitable fixing means, in order to achieve a defined positioning of the corresponding parts and thus to facilitate the final assembly. Further fixing means may be provided for fastening Bowden cables and electrical cables.

With a cable window winder, the guide area on the lock side, namely the structural unit which also comprises the lock support, is intended to carry means for cable deflection. These may be cable pulleys or sliding elements. In the case of sliding elements, said sliding elements may be integrated in one piece in the structural unit, if the structural unit is configured as a plastics injection-molded part or as a light metal casting.

In particular with the configuration of the structural unit as a plastics injection-molded part, it is advantageous to connect the means for cable deflection, during the fastening of the adjusting system, directly to the door body or a part provided on the door body. It is thereby achieved that the cable deflection forces are directly conducted into the door body, without taking a detour via the relevant guide area.

Advantageously, the guide area on the lock side may be configured as a U-shaped overlap of the lateral edge of the window. According to a preferred variant of the invention, it is provided that the associated carrier is not directly in forced guided engagement with this guide area but exclusively conducts the adjusting forces in the region of the lower edge of the window. The carrier of the second guide area is, however, preferably connected with an interference fit and in a displaceable and forcibly guided manner to the rail-like portion of the second guide area extending in the direction of displacement of the window. Thus, in this case, the forced guidance is only carried out in the longitudinal direction of the vehicle, so that misalignment in the parallelism of the two guide areas in the U-shaped overlap of the lateral edge of the window may be corrected in the region of the first guide area of the described structural unit.

According to an exemplary embodiment of the invention, on the basis of a guide area on the lock side made from plastics, the other second guide area is intended to be arranged in the region of the center of gravity of the window and namely, in particular, when the means for cable deflection on the lock side is not able to be fastened to the door body. An overload of the plastics guide area on the lock side is intended to be prevented in this manner.

In order to avoid an unstable window binding, tending toward the tilting of the window about the transverse axis of the vehicle, the second guide area, preferably made from a rigid metallic material, should be arranged such that said second guide area carries 60%-80% of the window weight and the first guide area (on the lock side) consisting of plastics, for example, carries 20%-40% of the window weight.

The principle of the invention may also be used for other double-strand window winder principles, in particular for those where the drive force is transmitted by toothed racks, spindles, flexible toothed strips or the like.

BRIEF DESCRIPTION OF THE DRAWINGS

The invention will be described in more detail hereinafter with reference to several embodiments and the illustrated figures, in which:

FIG. 1 is an adjusting system with a double-strand cable window winder with a guide area on the lock side, which comprises a highly integrated lock support in one piece, and with a further guide area on which a carrier is forcibly guided.

FIG. 1A is a schematic representation of a section through the guide area on the lock side in the region of the lateral window edge.

FIG. 4A is a schematic representation of a motor vehicle door with two mounting holes with a view of the wet space side of the door inner plate.

FIG. 16 is a modification of the adjusting system of FIG. 15.

FIG. 17 is an adjusting system with a window winder which comprises a drive traveling with the window to be adjusted.

FIG. 18 is an adjusting system with a single-strand window winder.

DETAILED DESCRIPTION

Figure 2:
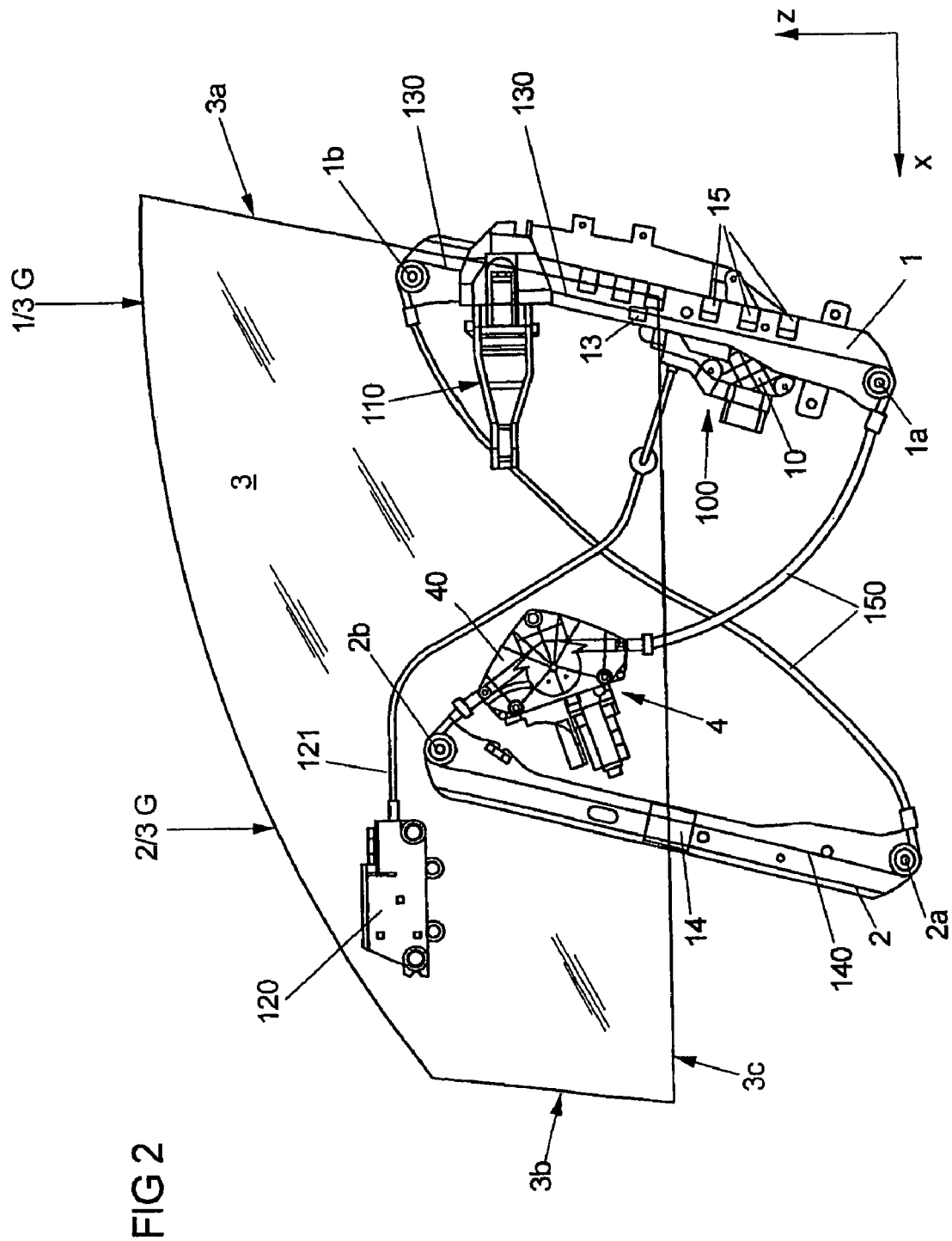
FIG. 2 is an adjusting system as in FIG. 1, but with an arrangement of the second guide area with approximately two thirds of the weight of the window.

An adjusting system for a motor vehicle, in particular a motor vehicle door, is shown in FIGS. 1 and 1A, which comprises, as essential system components, a window winder in the form of a double-strand cable window winder and a closure system.

The closure system is formed by a door lock 100 which is mounted on a lock support 10, preferably consisting of plastics or light metal, and of a door internal opener 120 which is coupled to the door lock 100 by a coupling mechanism and/or force transmitting mechanism in the form of a Bowden cable 121, and of an external handle holder 110 for an external door handle which in a corresponding manner to the door internal opener 120 may be coupled to the door lock 100.

The window winder is configured as a double-strand cable window winder with two guide areas spaced apart from one another transversely to the direction of adjustment z of the window 3 to be adjusted (i.e. along the longitudinal direction of the vehicle x), in the form of guide rails 1, 2 which respectively extend in the direction of adjustment z of the window 3. To guide the window 3 on these two guide rails 1, 2, the one guide rail 1 comprises a plurality of overlap areas 15 arranged one after the other in the direction of extension z of the guide rail 1, which overlap a rear lateral window edge 3a of the window 3 and thus form a guide channel for that lateral window edge 3a, in which the window 3 is guided with the aforementioned lateral window edge 3a in the direction of adjustment z and is secured against displacement movements perpendicular to the direction of adjustment z.

The second guide rail 2 serves to guide a carrier 14 in the direction of adjustment z of the window 3, which is positively engaged with the second guide rail 2, so that it may be displaced in the direction of adjustment z of the window 3 on the second guide rail 2 and simultaneously is secured against movements perpendicular to the direction of adjustment z. This carrier 14 is connected therewith in the region of the lower window edge 3c of the window 3, and is located adjacent to a lateral window edge 3b of the window 3 which, as the front window edge, opposes the rear window edge 3a associated with the first guide rail 1.

One respective portion 130 and/or 140 of a traction means in the form of a cable is guided along the two guide rails 1, 2 and transmits the adjusting force produced by an adjusting drive 4 to displace the window toward the window to be adjusted. To this end, on each of the two cable portions 130, 140 guided along one of the two guide rails 1, 2, in the known manner, a carrier 13 and/or 14 is fastened, which in turn in the region of the lower window edge 3c of the window 3 to be adjusted is connected therewith. In this connection, the carrier 13 associated with the first guide rail 1 is not engaged with that guide rail 1 but is merely movably guided by the cable portion 130 which is guided along that first guide rail 1 in the direction of adjustment z of the window 3 to be adjusted. The carrier 14 associated with the second guide rail 2 is, in contrast, positively engaged, as disclosed, with the second guide rail 2, so that said guide rail forces a defined direction of movement on the associated carrier 14 (in the direction of adjustment z of the window 3 to be adjusted).

To guide the two cable portions 130, 140 respectively along one of the two guide rails 1, 2, an upper and a lower deflection element 1a, 1b and/or 2a, 2b in the form of a deflection pulley are therefore respectively provided on the ends of the guide rails 1, 2.

In the region between the two guide rails 1, 2 the traction means is guided in Bowden sheaths 150 in a defined manner and, moreover, cooperates there with an adjusting drive 4.

The adjusting drive 4 comprises an assembly support 40 in the form of a mounting plate provided with fastening points 41, into which simultaneously a housing cover is integrated for receiving gear elements of the adjusting drive 4 and which additionally carries a motor 42 and a control apparatus 43 in the form of an electronic control unit of the adjusting drive 4. The adjusting drive 4 may be fastened to a suitable door component, for example a module support or a door inner plate, via the fastening points 41 provided on the mounting plate 40.

For adjusting the window 3 upward or downward in the direction of adjustment z, the motor 42 of the adjusting drive 4 is actuated in one or other rotational direction, the torque produced by the motor 42 being transmitted to the traction means, forming a closed loop and guided outside the guide rails 1, 2 in Bowden sheaths 150, via the gear elements of the adjusting drive 4 provided therefor, which traction means moves in one or the other direction depending on the rotational direction of the motor 42. As a result, the carriers 13, 14 connected to the cable portions 130, 140 of the traction means extended on the guide rails 1, 2 are raised or lowered along the direction of adjustment z, said carriers driving the window 3 to be adjusted. In this connection, on the one first guide rail 1 the window 3 is guided with a lateral window edge 3a in the guide channel of the first guide rail 1 formed by the overlap areas 15, whilst on the second guide rail 2 the window 3 is guided indirectly via the carrier 14 engaging positively with the second guide rail 2. The carrier 14 associated with the second guide rail 2, therefore, serves both for carrying the adjusting forces from the traction means to the window to be adjusted and for guiding of the window 3 to be adjusted along the associated guide rail 2 in a defined manner. The carrier 13 associated with the first guide rail 1, in contrast, serves exclusively for the transmission of the adjusting forces from the traction means to the window 3 to be adjusted, not however for guiding the window 3 along the guide rail 1 in a defined manner. This object is, however, undertaken by the engagement of the lateral window edge 3a in the guide channel formed on the first guide rail 1, see FIG. 1A.

A particularity of the adjusting system shown in FIGS. 1 and 1A is that the lock support 10 and the first guide rail 1 forming a guide area for the window 3 to be adjusted are combined into a structural unit, namely rigidly connected to one another. On the one hand, this may take place such that the lock support 10 and the first guide rail 1, as two separately made components, are rigidly connected to one another by suitable fastening means. According to a further embodiment, the lock support 10 and the first guide rail 1 are formed in one piece with one another, namely manufactured together as an integral component. In particular, plastics or light metal, respectively, are therefore suitable as materials.

Fastening points 11, 12 in the form of fastening openings provided on this structural unit 1, 10 serve for fastening the structural unit formed by the first guide rail 1 and the lock support 10 to a motor vehicle door.

This highly integrated structural unit formed by the first guide rail 1 of the window winder and the lock support 10 of the closure system, undertakes a plurality of functions within the entire adjusting system, including:

forming an interface for the external handle holder 110, receiving lock covers for theft protection and protection from moisture, forming a guide channel for the window to be adjusted by corresponding overlap areas 15 formed on the structural unit 1, 10 in the form of projections which are additionally able to receive a lateral plate gasket.

a plurality of fastening points 11, 12 for connecting the structural unit to a door body, for which through-passages also provided in the rotational axes of the deflection pulleys 1a, 1b may serve, deflection elements 1a, 1b for deflecting the traction means for forming a cable portion 130 extended along the guide rail 1 of the structural unit 1, 10.

By the creation of an integral support 1, 10 for essential components of a closure system, on the one hand, and a window winder, on the other hand, the two aforementioned adjustment devices are combined into an adjusting system, the components thereof being able to be pre-assembled together in a compact and inexpensive manner on the structural unit formed by the guide rail 1 and the lock support 2.

With regard to the possibility of pre-assembling a plurality of components of the adjusting system formed by the closure system and the window winder, in particular, it may also be considered that, for example, the door internal opener 120 may, during pre-assembly of the adjusting system, be already connected to the door lock 100 via the associated Bowden cable 121 and thereby may be integrated into the pre-assembled modular subassembly. The same applies to the second guide rail 2 and the adjusting drive 4, which may already be connected during pre-assembly to the components of a window winder arranged on the first guide rail 1, via the traction means guided in the Bowden sheaths 150, and thereby may be combined into a modular unit.

A plurality of modifications and developments of the adjusting system of FIGS. 1 and 1A are disclosed hereinafter with reference to FIGS. 2 to 8. In this connection, for better visibility of the correlation between corresponding components, even if said components are of slightly different construction in individual cases, the same respective reference numerals are used as in FIGS. 1 and 1A. Thus, for example, the first guide rail of the window winder is hereinafter always denoted by the reference numeral 1, irrespective of whether the construction of the guide rail may be varied.

The description of FIGS. 2 to 8 is, therefore, substantially restricted to the description of the differences from the adjusting system shown in FIGS. 1 and 1A. With regard to such components, which correspond in construction and function to the adjusting system shown in FIGS. 1 and 1A, reference is therefore made to the description of the adjusting system shown in FIGS. 1 and 1A.

The adjusting system shown in FIG. 2 corresponds almost completely, with regard to its function and with regard to the construction of the individual components, to that described with reference to FIGS. 1 and 1A. A particularity of the adjusting system shown in FIG. 2 is that the two guide rails 1, 2 for the window 3 are arranged perpendicular to their direction of adjustment z, namely in the longitudinal direction of the vehicle x, one after the other such that the carrier 13 guided on the guide rail 1 on the lock side associated with the rear window edge 3a merely carries approximately 20% to 40%, preferably approximately ⅓, of the weight G of the window 3 to be adjusted, whilst the other carrier 14 guided on the second guide rail 2, carries approximately 60% to 80%, preferably approximately ⅔ of the weight G of the window. To this end, the (front) second guide rail 2 facing away from the lock is clearly spaced apart from the (front) lateral window edge 3b facing away from the lock, and is located slightly behind the middle of the lower window edge 3c in the longitudinal direction of the vehicle x, when viewed from the rear lateral window edge 3a on the lock side.

A further difference from the arrangement of FIGS. 1 and 1A is that the adjusting drive 4 is arranged directly in front of the upper deflection element 2b (cable pulley) of the second guide rail 2 facing away from the lock, namely the distance between the cable outlet of the adjusting drive 4, via which the traction means, in the form of a cable, driven by the adjusting drive 4, is supplied to the upper deflection element 2b of the second guide rail 2 and thus also to the second guide rail 2 itself, and the adjusting drive 4 itself is reduced to a minimum.

By means of the disclosed design of the adjusting system shown in FIG. 2, on the one hand, regarding the arrangement of the two guide rails 1, 2—observed along the window lower edge 3c—and, on the other hand, regarding the arrangement of the adjusting drive 4 relative to the second guide rail 2, in particular the upper cable deflection element 2b thereof, the frictional losses in the Bowden sheaths 150 are minimized and the guide area on the lock side (guide rail 1) of the adjusting system is impinged upon by the relatively low weight of the window 3 (compared to the other, second guide rail 2). As a result, for forming the guide area on the lock side which is combined with the lock support 10 into a structural unit, materials are also used which have a lower load bearing capacity; the choice of materials may therefore also particularly affect aspects other than the load-bearing capacity.

Figure 3:
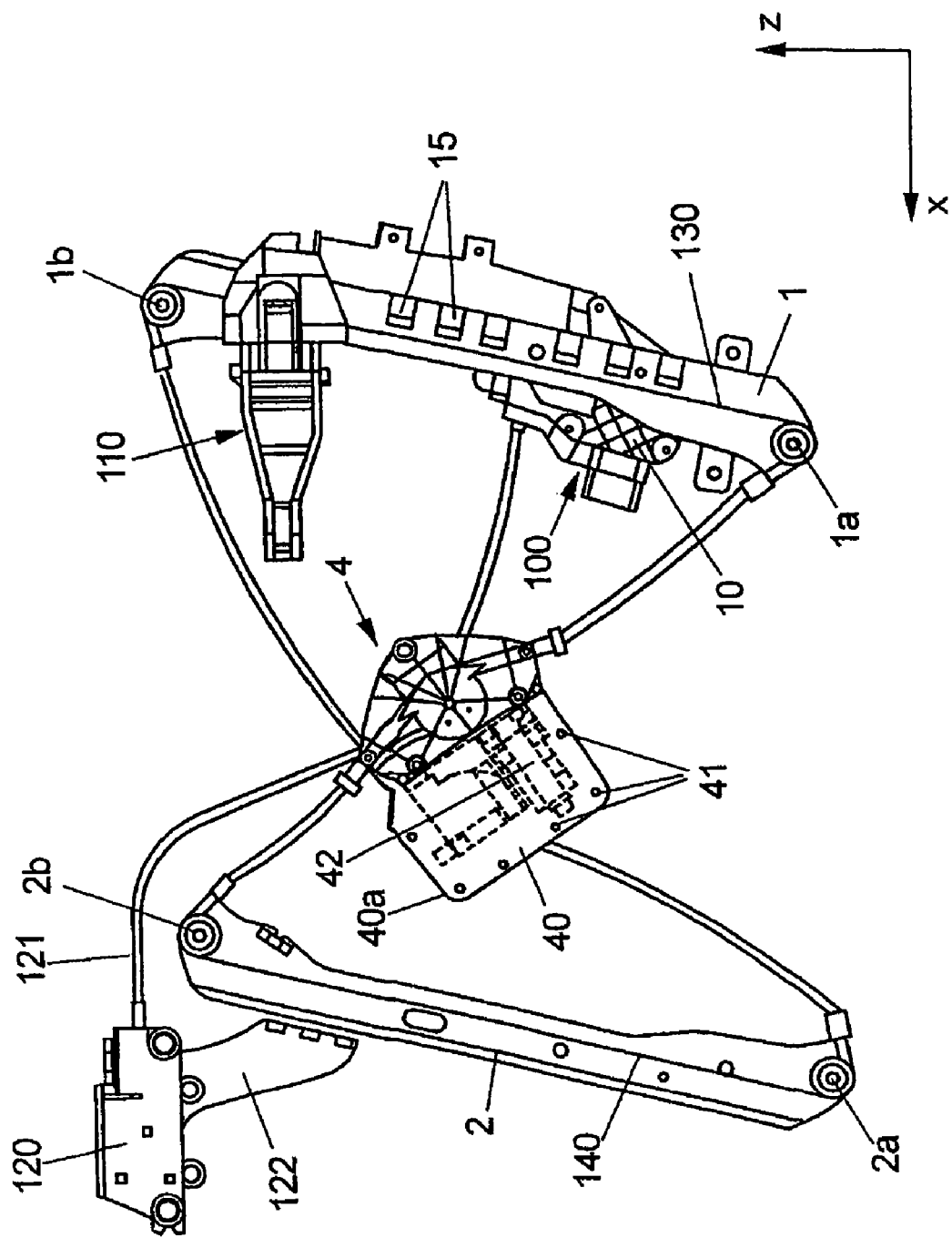
FIG. 3 is an adjusting system as in FIG. 2 but with a mounting plate for sealing a mounting hole in a wet/dry space separation of a motor vehicle door, on which the motor and an electronic control unit are arranged on the dry space side.

FIG. 3 shows a development of the adjusting system of FIG. 2, in which the assembly support 40, formed by a mounting plate, of the adjusting drive 4 comprises a peripheral sealing surround 40a on the outer edge, which may serve to seal a mounting hole in the door body of a motor vehicle, for example in an assembly support or a door inner plate, a sufficient seal of the dry space relative to the wet space of the vehicle door being intended to be ensured by the sealing surround 40a. The individual components of the adjusting drive 4 are, therefore, arranged on the assembly support 40 such that the electrical and electronic components, such as for example the drive motor 42 and an associated electronic control unit, are located in the dry space, whilst purely mechanical components, such as for example the gear elements driven by the motor 42, may be arranged in the wet space. As a result, the space available in the dry and wet spaces of the vehicle door is optimally used. Fastening points 41, for example in the form of fastening openings provided on the assembly support 40 therefore serve for fastening the assembly support 4 to a part of the motor vehicle bodywork.

Furthermore, in the embodiment shown in FIG. 3, a bracket 122 is associated with the door internal opener 120, with which the door internal opener 120 may be provisionally, in particularly positively and releasably, arranged according to the principle of a clip connection, to the second guide rail 2, during transportation and before the installation of the adjusting system, which may be pre-assembled, shown in FIG. 3. When the adjusting system shown in FIG. 3 is fastened to the door body of a motor vehicle, the provisional connection between the door internal opener 120 and the second guide rail 2 is again released via the bracket 122 and the door internal opener 120 is secured in its functional position on the door body.

Figure 4:
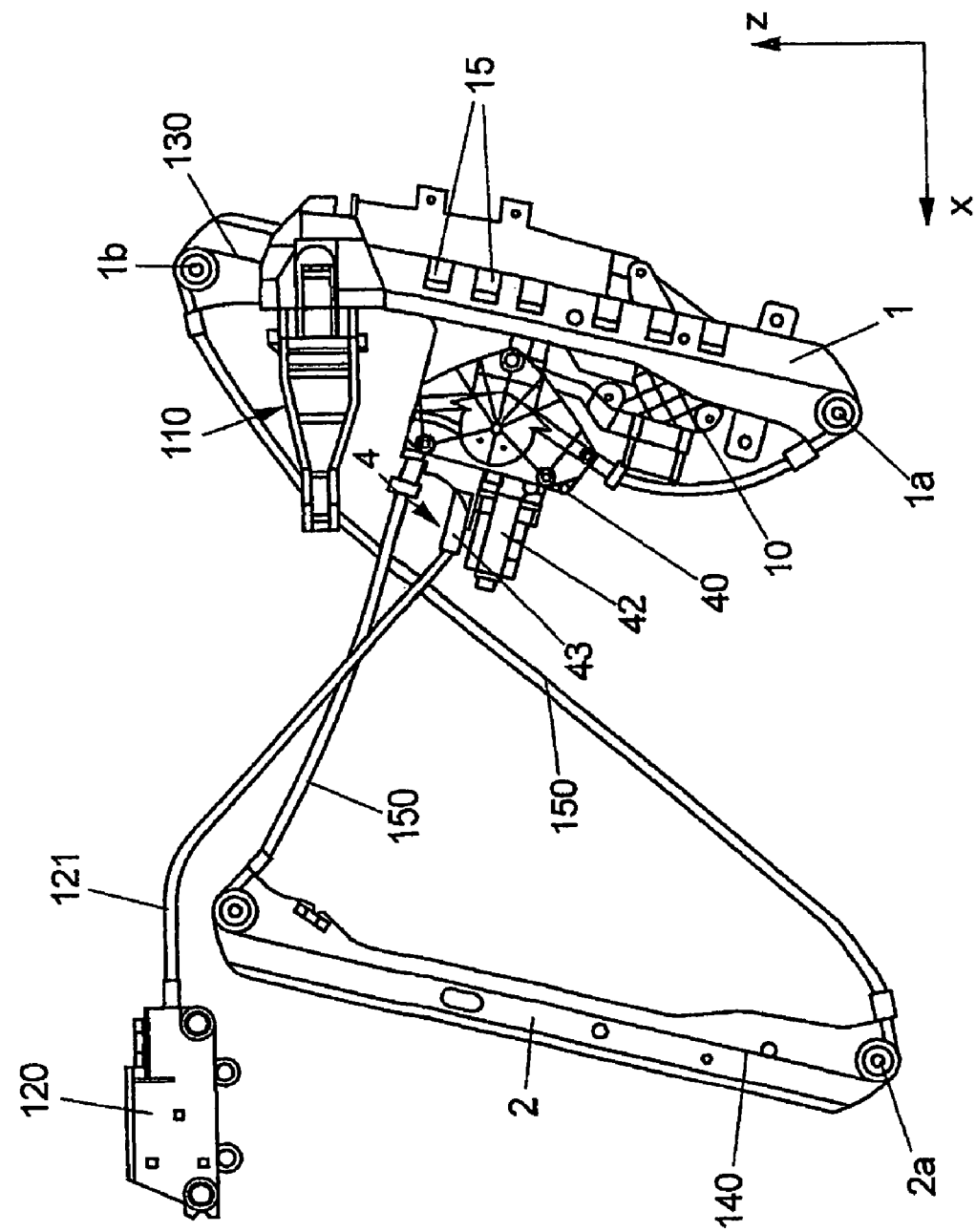
FIG. 4 is an adjusting system as in FIG. 2, but with an integration of the mounting plate carrying the drive unit into the structural unit made up of the guide area on the lock side and the lock support.

In the embodiment of an adjusting system shown in FIG. 4, the assembly support 40 of the adjusting drive 4 is integrated into the structural unit formed from the first guide rail 1 and the lock support 10, namely integrally formed on this structural unit or fastened as a separate component to this structural unit. Moreover, the adjusting system shown in FIG. 4 corresponds to that described with reference to FIG. 2.

For assembling the adjusting system shown in FIG. 4 to a motor vehicle door, two advantageous possibilities are proposed which are described hereinafter by referring to the motor vehicle door shown schematically in FIG. 4A, which comprises a door inner skin comprising two mounting holes 60, 62, for example in the form of a door inner plate or an assembly support which is to be fastened to the motor vehicle door, and which may be combined into a door module outside the motor vehicle door with pre-assembled components.

If the adjusting system is to be assembled from the dry space side, namely from the side of the door inner skin 6 facing the vehicle interior of a motor vehicle, firstly the adjusting system (with the exception of the door internal opener 120) as shown in FIG. 4, is introduced through the larger mounting hole 62 of the two mounting holes 60, 62, onto the side of the door inner skin 6 facing away from the vehicle interior, i.e. into the door frame and/or wet space formed between the door inner skin 6 and the door outer skin which is not visible in FIG. 4A. Subsequently, the electrical and electronic components of the adjusting drive 4, i.e. in particular the motor 42 and the control unit 43 are fed through the smaller mounting hole 60 again into the dry space, which is located on the side of the door inner skin 6 facing the vehicle interior. Subsequently, the assembly support 40 with its fastening points 41, see FIG. 2, is superimposed over the fastening points 61 surrounding the smaller mounting hole 60, so that the assembly support 40 may be fixed to the door inner skin 6 by suitable fastening means, for example in the form of screws or rivets. As a result, at the same time, the smaller mounting hole 60 of the door inner skin 6 is closed by the assembly support 40.

Moreover, the structural unit formed by the first guide rail 1 and the lock support 10, and the second guide rail 2 are fixed to the door inner skin 6 via suitable fastening points. Subsequently, therefore, the larger mounting hole 62 is also closed by a suitable cover plate in order to ensure a moisture-tight separation of the dry space from the wet space of the vehicle door.

In the event that the mounting free space which is available inside the door frame, i.e. on the side of the door inner skin facing away from the vehicle interior, in particular transversely to the door plane, is not sufficient for the mounting of an assembly support 40 already equipped with the motor 42 and the control unit 43, the motor 42 and the control unit 43 may also be separately secured on the dry space side, i.e. the side of the door inner skin 6 facing the vehicle interior, visible in FIG. 4A, after the assembly support 40 has been secured to the door inner skin 6 superimposed over the smaller mounting hole 60.

Alternatively to the aforementioned mounting method, with a motor vehicle door with a removable door outer plate, the adjusting system shown in FIG. 4 may be placed directly thereon from the wet space side, i.e. on the non-visible side of the door inner plate 6 in FIG. 4A, the motor 42 and the control unit 43 of the adjusting drive 4 being fed through the smaller mounting hole 60 of the door inner skin 6 into the dry space and, in turn, the fastening points 41 of the mounting plate 40 being superimposed over the fastening points 61 of the small mounting hole 60, so that the assembly support 40 may be fixed by suitable fastening means. Then, in turn, the structural unit consisting of the first guide rail 1 and the lock support 10 and the second guide rail 2 are fixed to the door inner skin. The larger mounting hole 62 of the door inner skin 6 is, in this case, superfluous and may be dispensed with.

Figure 5:
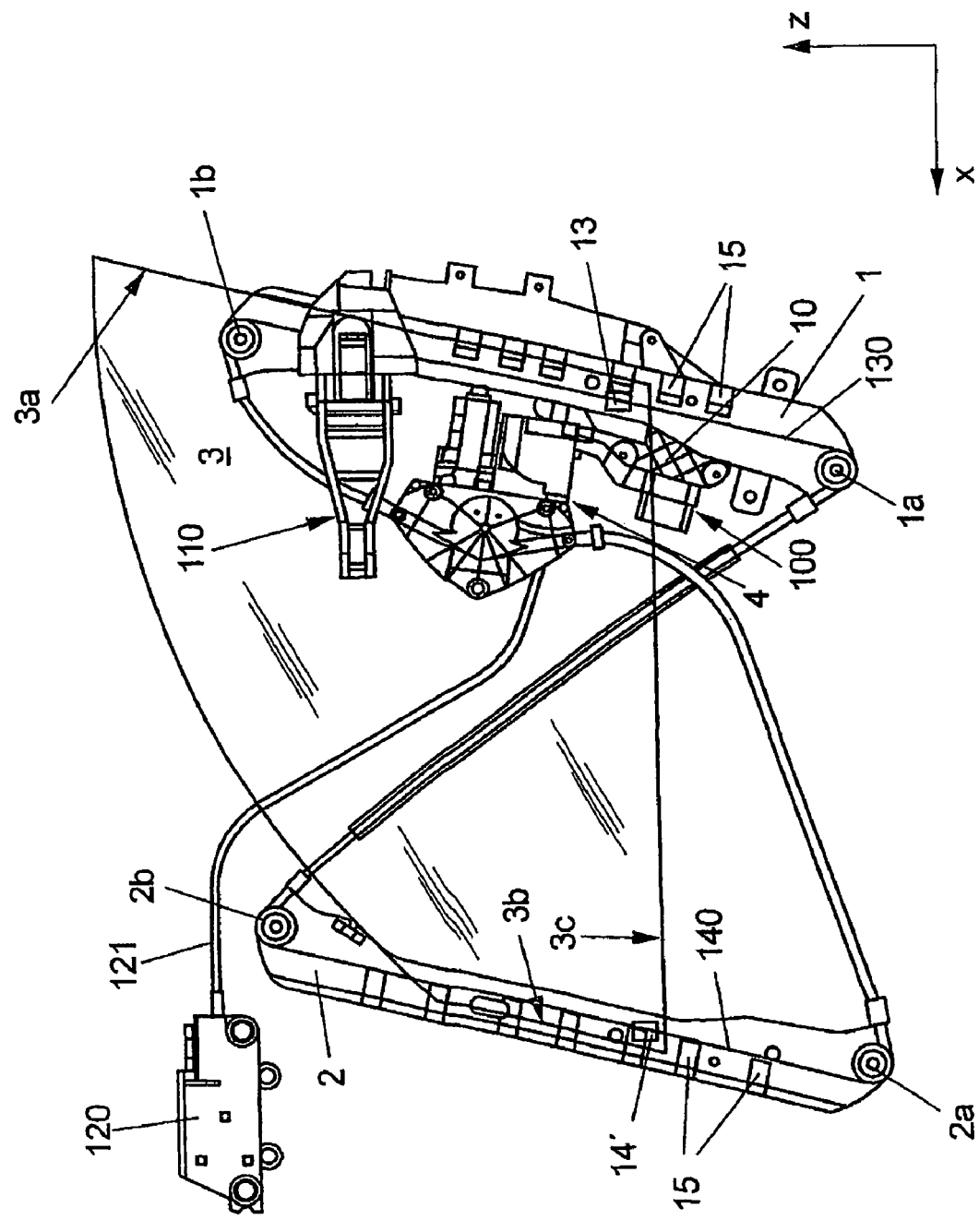
FIG. 5 is an adjusting system similar to FIG. 1 but with two guide areas respectively in the form of U-shaped overlaps of the lateral window edges.

FIG. 5 shows a modification of the adjusting system of FIG. 4, in which both guide rails, i.e. both the first guide rail 1 and the second guide rail 2 comprise overlap areas formed by angled projections, for respectively one of the two lateral window edges 3a, 3b of the window to be adjusted, so that both the first guide rail 1 and the second guide rail 2 respectively comprise a guide channel for a lateral window edge 3a and/or 3b of the window 3. As the first guide rail 1, on the one hand, and the second guide rail 2, on the other hand, engage with their respective overlap areas 15 the respectively associated lateral window edges 3a and/or 3b, in the opposing direction, i.e. the guide channels formed by the overlap areas 15 of the first guide rail 1 and the second guide rail 2 oppose one another and thus face one another with the open sides, both guide channels together form a forced guidance for the window to be adjusted, which is only movable in the direction of adjustment z but not perpendicular thereto.

In this embodiment, both carriers 13, 14', i.e. both the carrier 13 guided along the first guide rail 1 and the carrier 14' guided along the second guide rail 2, are respectively configured as carriers which are loosely guided along the associated guide rail 1 and/or 2, which do not engage in the associated guide rails and accordingly are also not forcibly guided on the guide rails. The forced guidance of the window 3 in the direction of adjustment z therefore with the window winder of the adjusting system shown in FIG. 5, is not achieved by the forced guidance of at least one of the carriers 13, 14' but exclusively by the forced guidance of the window 3 with its lateral window edges 3a, 3b in, respectively, one of the two guide rails 1, 2 and/or their respective guide channel.

Figure 6:
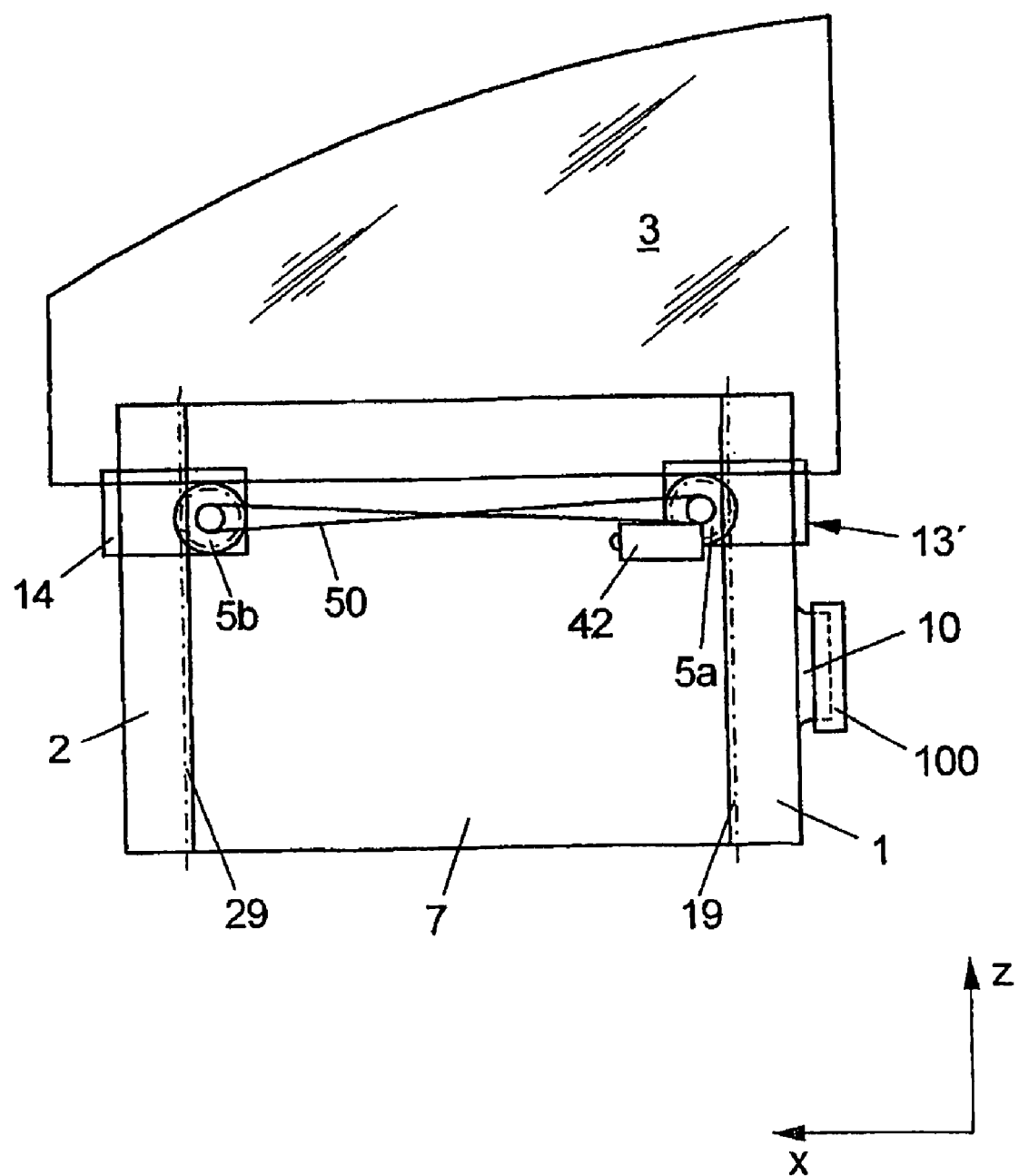
FIG. 6 is a schematic representation of a double-strand toothed rack window winder with an integrated lock support.

In FIG. 6 an adjusting system is shown schematically with a double-strand toothed rack window winder, which comprises two guide rails 1, 2 extended in the direction of adjustment z of the window and provided with a longitudinal toothed portion 19 and/or 29 which are spaced apart from one another transversely to the direction of adjustment z on a module support and/or assembly support 7 and, with a lock holder 10 fixed to the first guide rail 1, i.e. integrally formed or fastened as a separate component, form an integral structural assembly which, for example, may consist of plastics.

Respectively one gear element 5a, 5b in the form of a gearwheel engages in the toothed portions 19, 29 of the two guide rails 1, 2 and is, in turn, rotatably mounted on a carrier 13' or 14 displaceably guided on the respective guide rail 1 and/or 3. A drive motor 42 is associated with one of the gear elements 5a, namely the gearwheel associated with the first guide rail 1, and drives the corresponding gear element, i.e. during operation triggers a rotation of the associated gearwheel 5a. This, in turn, cooperates via a transmission element 50 in the form of a toothed belt with the other gear element 5b in the form of a gearwheel, so that during operation of the motor 42 the gear element 5b in the form of a gearwheel associated with the second guide rail 2 is also driven. According to the rotational direction of the two gearwheels 5a, 5b, the associated carriers 13' and/or 14 are raised or lowered along the associated guide rail 1 and/or 2. This leads to a raising or lowering of the window 3 which is fastened with its lower edge to the two carriers 13', 14 in the known manner.

The lock support 10 connected to the first guide rail 1 may therefore also form a part of the lock housing or another housing, for example a housing of an electronic control unit.

With this embodiment of an adjusting system it should be taken into account that the first guide rail 1 and the lock support 10 do not form a pre-constructed structural unit because they are arranged together on a module support and/or assembly support 7. It is more important that the first guide rail 1 and the lock support 10 are directly combined into a structural unit, i.e. either fastened directly to one another or form components of an integrally formed structural unit.

Figure 7:
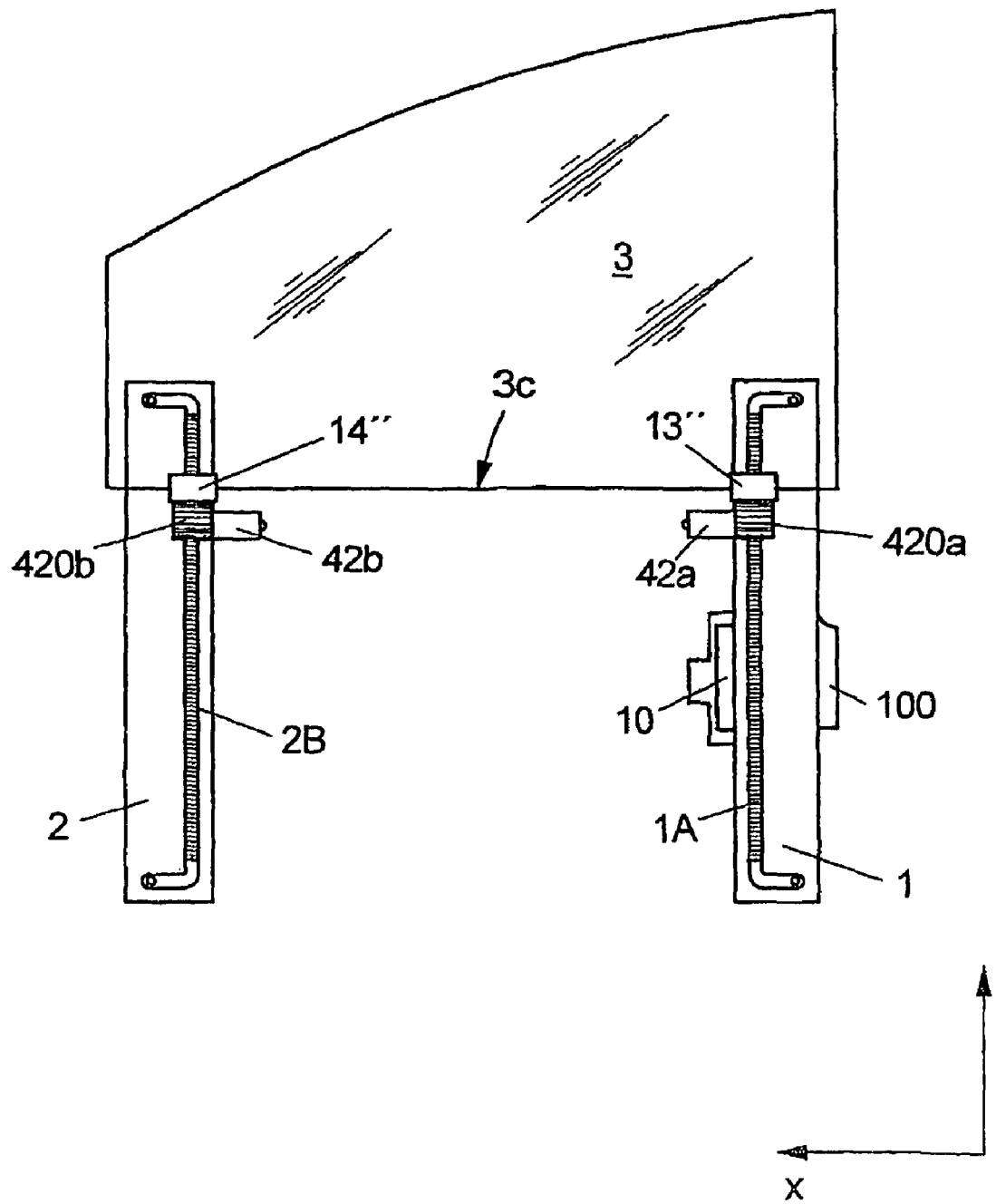
FIG. 7 is a schematic representation of a double-strand spindle window winder with a lock support integrated into the guide area on the lock side.

FIG. 7 shows an embodiment of the adjusting system in which one respective spindle 1A and/or 2B extended in the direction of adjustment z is arranged fixedly in terms of rotation both on the first guide rail 1 and on the second guide rail 2, and on each of the two spindles 1A, 2B, a spindle nut 420a, 420b is mounted which may be rotated by an associated motor 42a and/or 42b, which during a rotational movement triggered by the respective rotor 42a or 42b, simultaneously carries out a longitudinal movement along the associated spindle 1a or 1b. A carrier 13" and/or 14" is associated with each of the two spindle nuts 420a, 420b in addition to a traveling motor 42a and/or 42b and is connected in the region of the window lower edge 3c to the window 3 to be adjusted and during a longitudinal movement of the respective spindle nut 420a and/or 420b is driven in the direction of adjustment and thus transmits the adjustment movement to the window 3.

The first guide rail 1 is thus, in turn, configured as a structural unit with a lock support 10 to which a door lock 100 is fastened.

Figure 8:
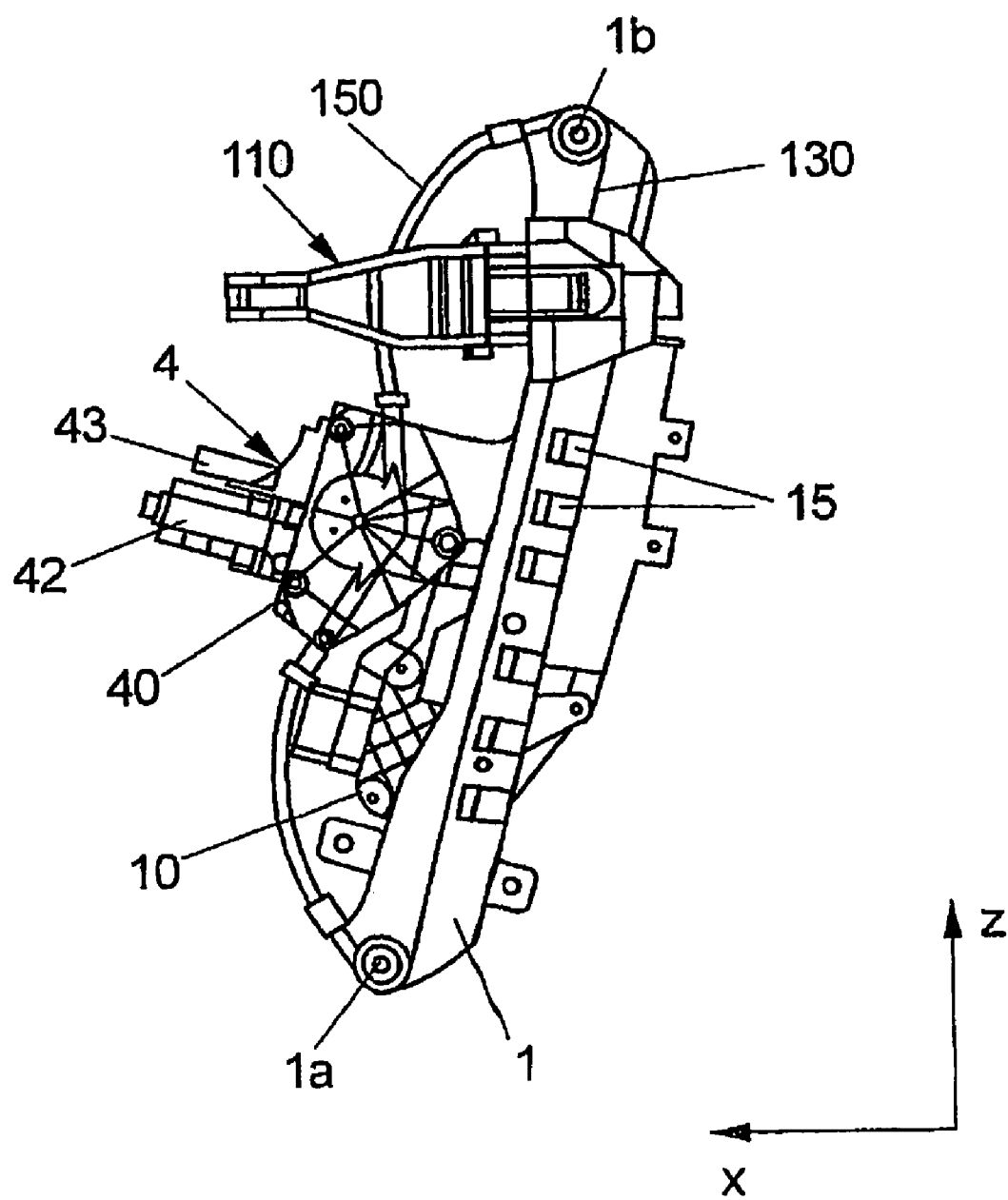
FIG. 8 is a single-strand adjusting system with an integration of the mounting plate carrying the drive unit into the structural unit made up of the guide area and the lock support.

FIG. 8 shows in a modification of the previous embodiments, in particular of the adjusting system according to FIG. 4, a single-strand window winder which comprises merely one single guide rail 1, said guide rail in turn forming a structural unit with the lock support 10. The structural unit formed by the lock support 10 and the one guide rail 1, including the components fastened thereto, is of substantially identical design to the embodiment of FIG. 4. Thus the one guide rail 1 comprises a guide channel formed by a plurality of overlap areas 15, for a lateral window edge and the structural unit formed by the guide rail 1 and the lock support 10 also carries the adjusting drive 4 and an external handle holder 110.

In contrast to the embodiment shown in FIG. 4, the single-strand window winder of FIG. 8, however, has no second guide rail 2. Furthermore, in FIG. 4 the door internal opener is not shown therewith. Due to the omission of the second guide rail, in the embodiment shown in FIG. 8 of an adjusting system, it is advantageous if the one guide rail 1 is configured such that it allows the forced guidance of an associated carrier in the direction of adjustment z.

Hereinafter, with reference to FIGS. 9 to 19A, adjusting systems of the type described with reference to FIGS. 1 to 8, are shown schematically together with further components of the door body, in order to explain different possibilities of the integration and assembly of the adjusting systems on a motor vehicle.

In the description of FIGS. 9 to 19A, details regarding the construction of the adjusting systems will only be provided insofar as this is of importance for the integration into the respective components of the door body. Moreover, regarding the construction of the respective adjusting system, which is only shown schematically in FIGS. 9 to 19A—compared with the detailed view in FIGS. 1 to 8 reference is made to the embodiments of FIGS. 1 to 8.

Figure 9:
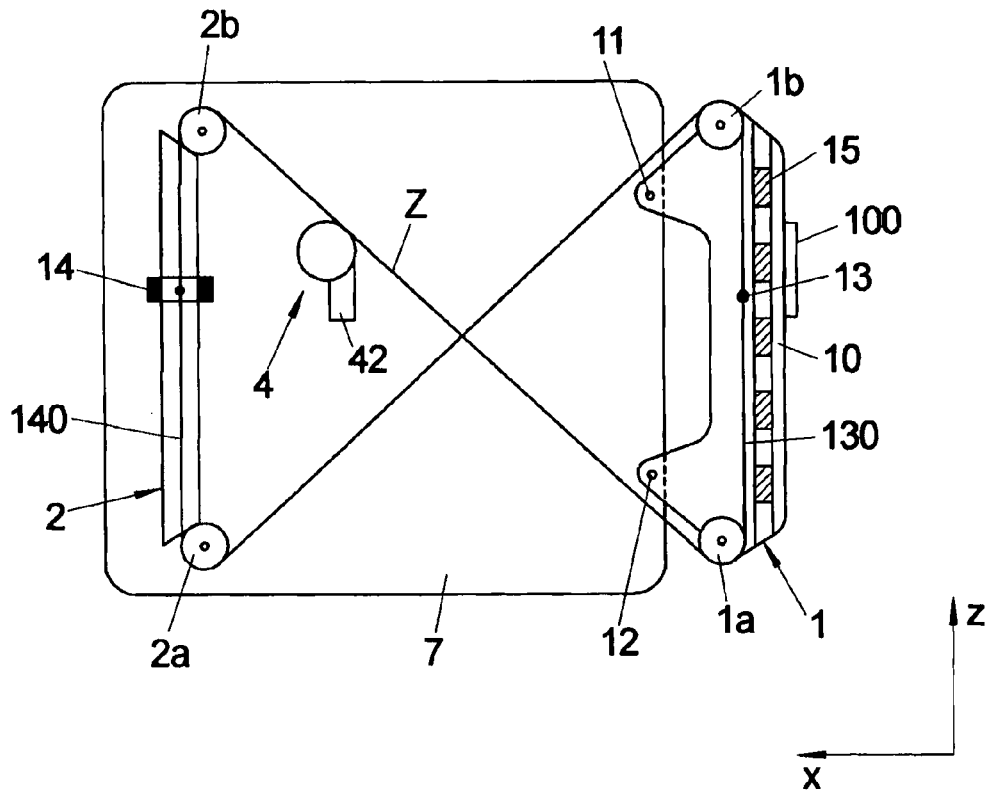
FIG. 9 is a schematic representation of an adjusting system with a double-strand window winder and an assembly support for receiving the adjusting system in the pre-assembled state.

In the embodiment shown in FIG. 9, the structural unit pre-constructed from the first guide rail 1 and the lock support 2 is fastened via fastening points 11, 12 to an assembly support 7, in which simultaneously the second guide rail 2 of the window winder is integrated. The use of plastics as material for the assembly support 7 is, therefore, particularly advantageous, the second plastics rail 2 being able to be easily formed integrally on the support 7. The adjusting drive 4 acting on the traction means Z of the window winder is advantageously pre-assembled on the door module support and/or assembly support 7, an arrangement of the electrical and electronic components being able to be provided on the dry space side in the known manner and of the purely mechanical components on the wet space side of the assembly support 7.

Figure 10:
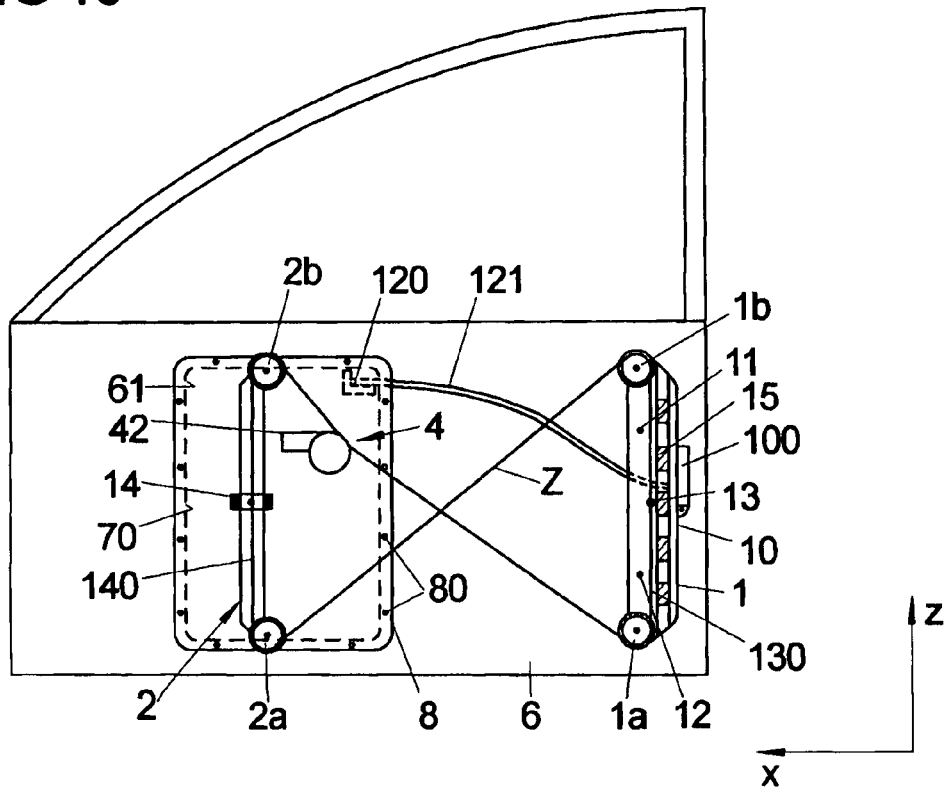
FIG. 10 is an adjusting system with a double-strand window winder after installation in a motor vehicle door.
Figure 11:
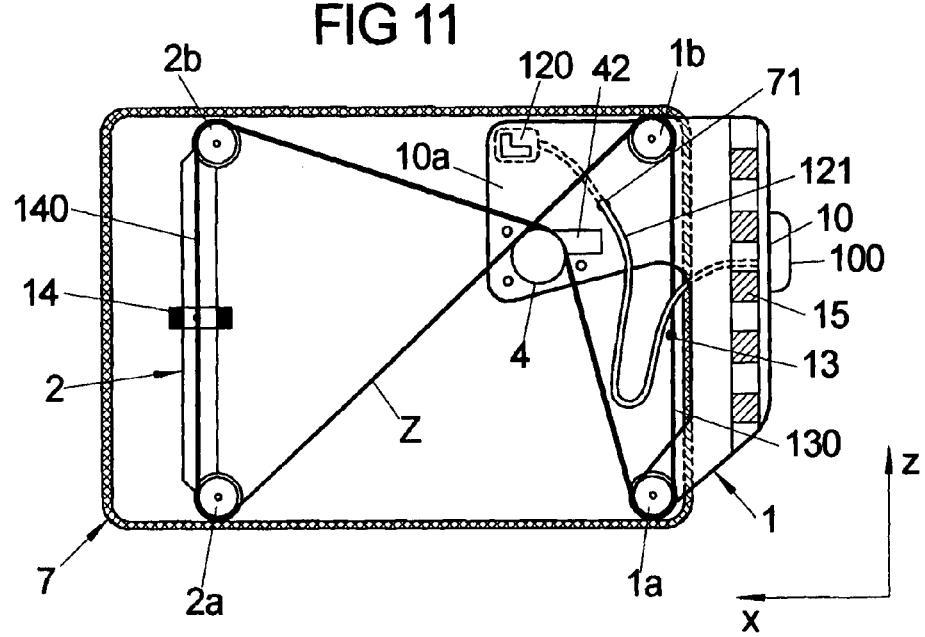
FIG. 11 is an adjusting system with a double-strand window winder, pre-assembled on an assembly support consisting of metal.

In the embodiment shown in FIG. 10 of an adjusting system arranged on a motor vehicle door, the door inner skin 6 of a motor vehicle door comprises a portion 61, which is superimposed by a module support 8. This module support 8 carries both the second guide rail 2 and the adjusting drive 4 of the window winder, the second guide rail 2 optionally being able to be integrally formed on the door module support 8. Furthermore, the module support 8 may be provided for receiving the door internal opener 120.

Fastening points 80, for example in the form of fastening openings, distributed on the edge of the module support 8 serve for fastening the module support 8 to the door inner skin 6, through which the module support 8 may be fastened by rivets or screws to the door inner skin 6. According to FIG. 11, an assembly support 7 consisting of a high-strength material, for example steel, on which in particular all deflection elements 1*a*, 1*b*; 2*a*, 2*b* in the form of deflection pulleys of the window winder are mounted, serves to receive the adjusting system. As a result, cable forces arising on the deflection pulleys 1*a*, 1*b*; 2*a*, 2*b* are introduced directly into the highly stable assembly support 7 which, in turn, is connected to the door body of a motor vehicle.

On the one hand, the structural unit consisting of the first guide rail 1 and the lock support 10 and the components mounted thereon, such as for example the adjusting drive 4 and the lock 100 is secured to the assembly support 7 and, on the other hand, also the second guide rail 2. For receiving the adjusting drive 4, the structural unit comprising the first guide rail 1 and the lock support 10 comprises a corresponding receiving region 10*a*. This may, moreover, serve for receiving the door internal opener 120 in a parking position and/or transport position, from which in the final assembly of the motor vehicle door it is transferred into its final functional position.

Figure 12:
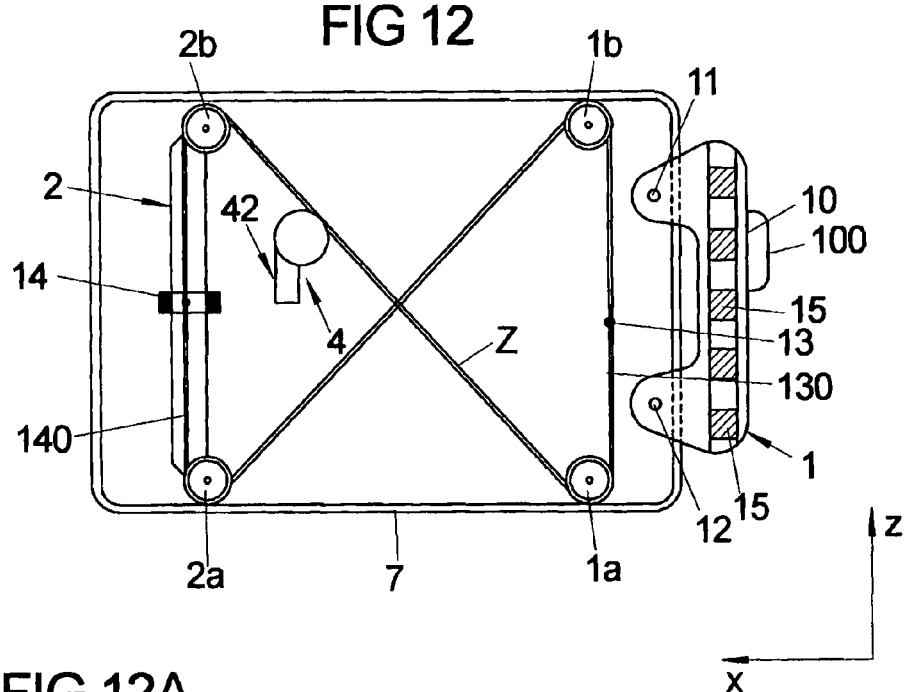
FIG. 12 is an adjusting system with a double-strand window winder, pre-assembled on an assembly support consisting of plastics.

In FIG. 12 a modification of the embodiment of FIG. 9 is shown, in which the deflection elements 1*a*, 1*b* associated with the first guide rail 1, and the cable portion 130 defined by these deflection elements extending parallel to the first guide rail, together with the associated carrier 13 are spaced apart from the first guide rail 1 transversely to the direction of adjustment z of the window. The guidance of the one lateral window edge of the window to be adjusted in the first guide rail 1 and the coupling of the window to the window winder via the carrier 13 associated with the first guide rail 1 are, in this case, therefore, spatially separated. In particular, the deflection elements 1*a*, 1*b* associated with the first guide rail 1 and spaced apart from the guide rail 1 are fastened directly to the assembly support 7.

Figure 12A:
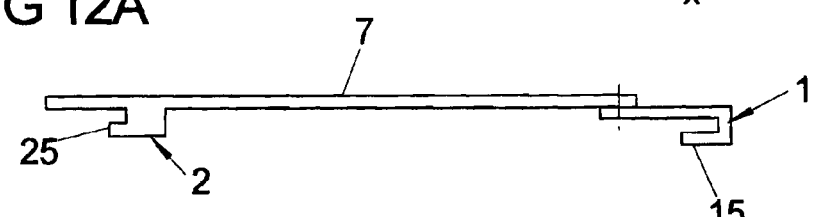
FIG. 12A shows a cross section through the arrangement according to FIG. 12.
Figure 12B:
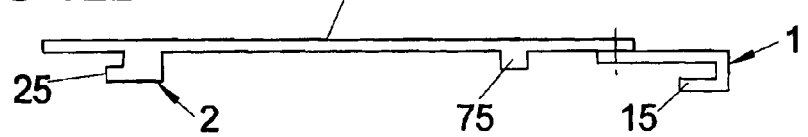
FIG. 12B shows a modification of the cross section according to FIG. 12A.

FIG. 12*a* shows a cross section through the arrangement according to FIG. 12, from which it emerges that the second guide rail 2 may advantageously be integrally formed on the assembly support 7 and comprises at least one angled portion 25, in order to create a positive engagement with the associated carrier 14. FIG. 12B shows a modification of the cross section according to FIG. 12A, according to which an additional guide area 75 extended in the direction of adjustment z is provided, and in particular formed, on the assembly support 7, which may serve to guide the carrier 13 extending adjacent to the first guide rail 1.

Figure 13:
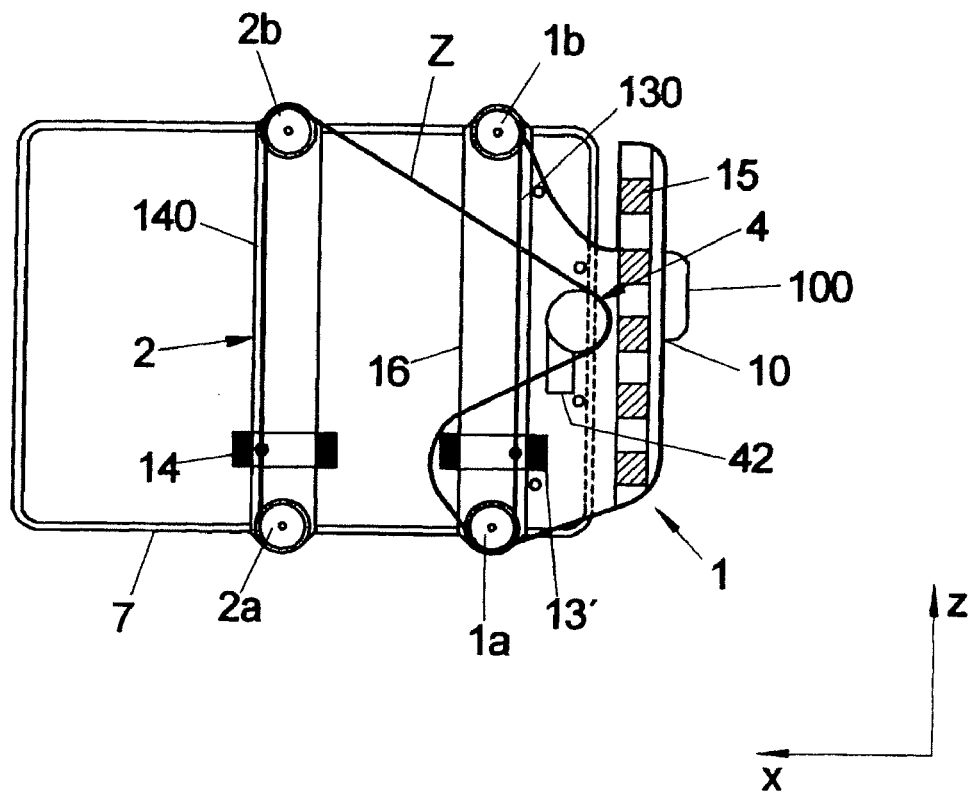
FIG. 13 is an adjusting system which may be made up of two modules, with a double-strand window winder.
Figures 13A, 13B:
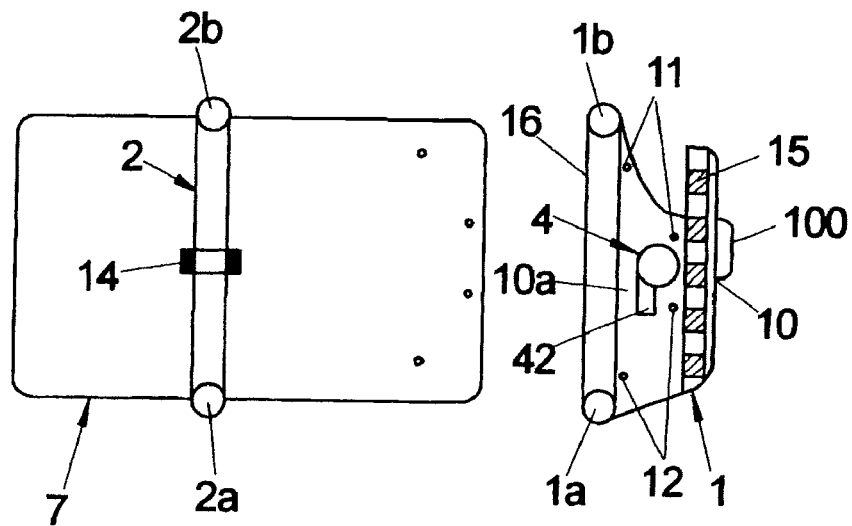
FIGS. 13A and 13B is an adjusting system which may be made up of two modules, with a double-strand window winder.

In FIGS. 13, 13A, and 13B an arrangement is shown in which the second guide rail 2 of the window winder is arranged on an assembly support 7, preferably consisting of a high-strength material, for example steel.

Moreover, the structural unit comprising the first guide rail 1 and the lock support 10 may be secured to this assembly support via suitable fastening points 11, 12. Said structural unit also carries the adjusting drive 4 of the window winder. Furthermore, on that structural unit 1, 10 an additional guide area 16 is provided which serves to guide the carrier 13' associated with the first guide rail 1 at a distance from that first guide rail 1. The carrier 13' associated with the first guide rail 1 but guided at a distance therefrom on a separate guide area 16, may therefore in particular be configured and provided for positive engagement in the additional guide area 16. The additional guide area 16 is, therefore, viewed from the first guide rail 1, arranged on the other side of the adjusting drive 4. The two deflection elements 1*a*, 1*b* in the form of deflection pulleys associated with the first guide rail 1 are located at the upper and lower ends of the additional guide area 16.

Figure 14:
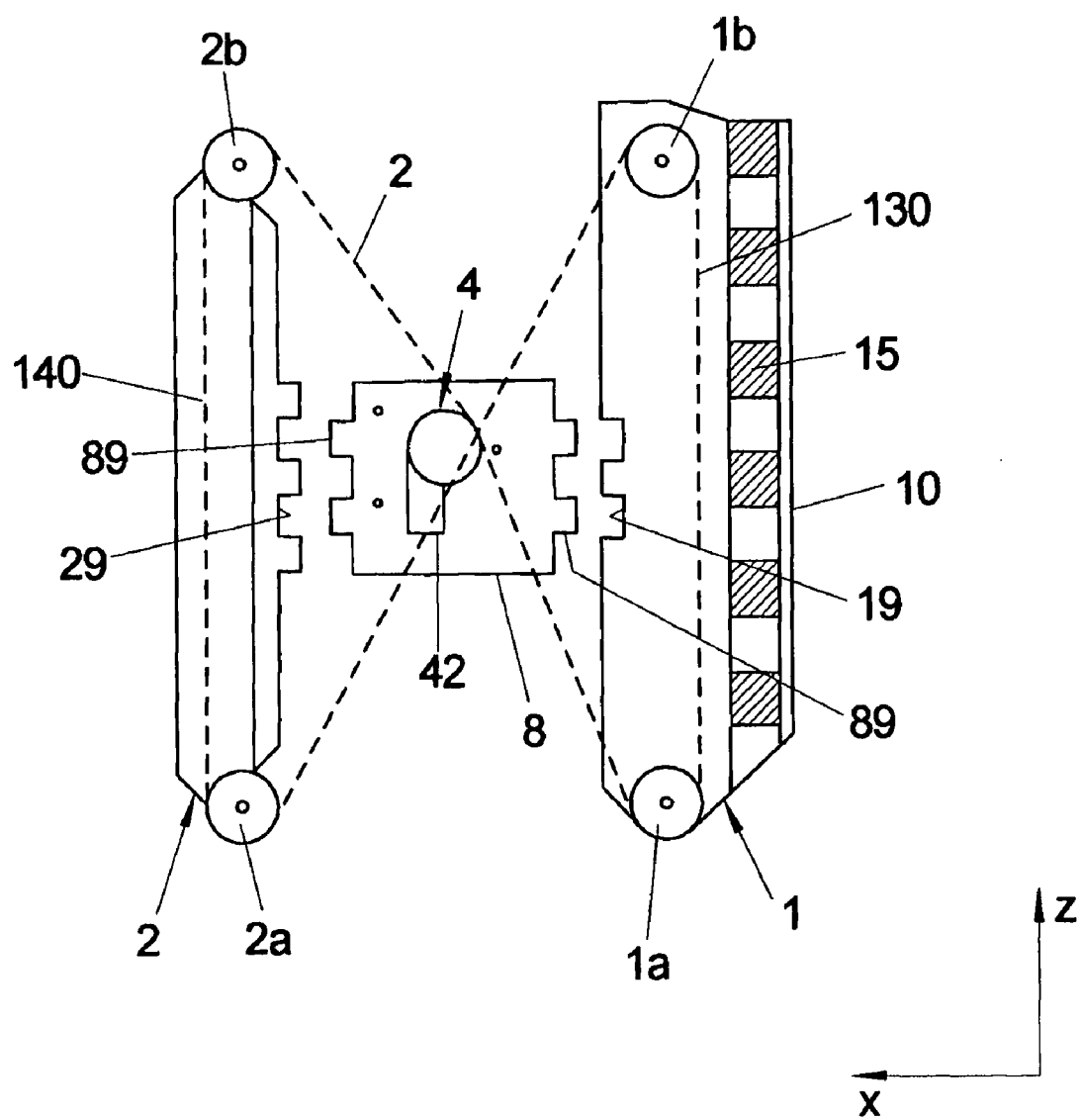
FIG. 14 is an adjusting system which may be made up of three modules, with a double-strand window winder.

FIG. 14 shows an adjusting system which may be made up of three structural units (modules), with a first structural unit which comprises, in particular, the first guide rail 1 and the lock support 10; with a second structural unit which comprises, in particular, the second guide rail 2; and with a third structural unit which comprises a module support 8 carrying the adjusting drive 4. The three structural units and/or modules may be plugged together via plug regions 19, 89; 29, 89 associated with one another, so that they may be transported in the plugged-together state and fastened to a door body. In this connection, such materials are specifically selected for the individual components which are particularly advantageous for the respective purpose of use. During manufacture of the bearing components of the individual structural units, respectively made of plastics, a sufficiently hard plastic may be selected, for example, for the two guide rails 1, 2, so that the adjusting forces may be absorbed there. The module support serving to receive the adjusting drive 4 is nevertheless preferably made from a plastic which is optimized with regard to the mounting of gear elements of the adjusting drive 4.

Figure 15:
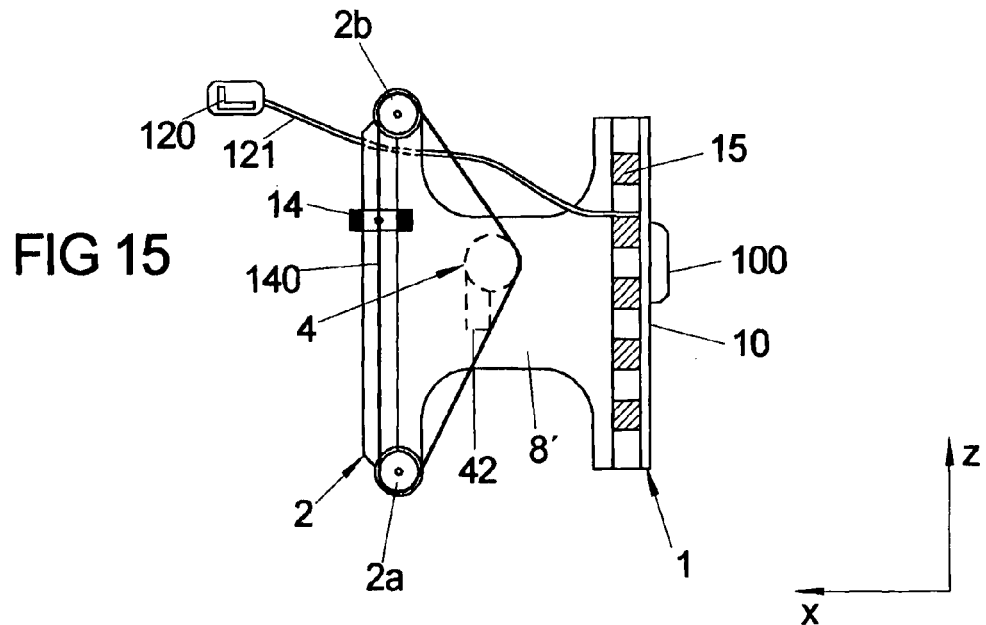
FIG. 15 are an adjusting system made up of one module, with a single-strand window winder.

In FIG. 15 A modification of the adjusting system shown in FIG. 14 is shown, in which the structural unit consisting of the first guide rail 1 and the lock support 10 is connected by an integrally formed connecting area 8' to the second guide rail 2, which connecting area receives the adjusting drive located between the two guide rails 1, 2. In this connection, preferably the two guide rails 1, 2, the lock support 10 and also the connecting area 8' may be formed from plastics.

Figure 15A:
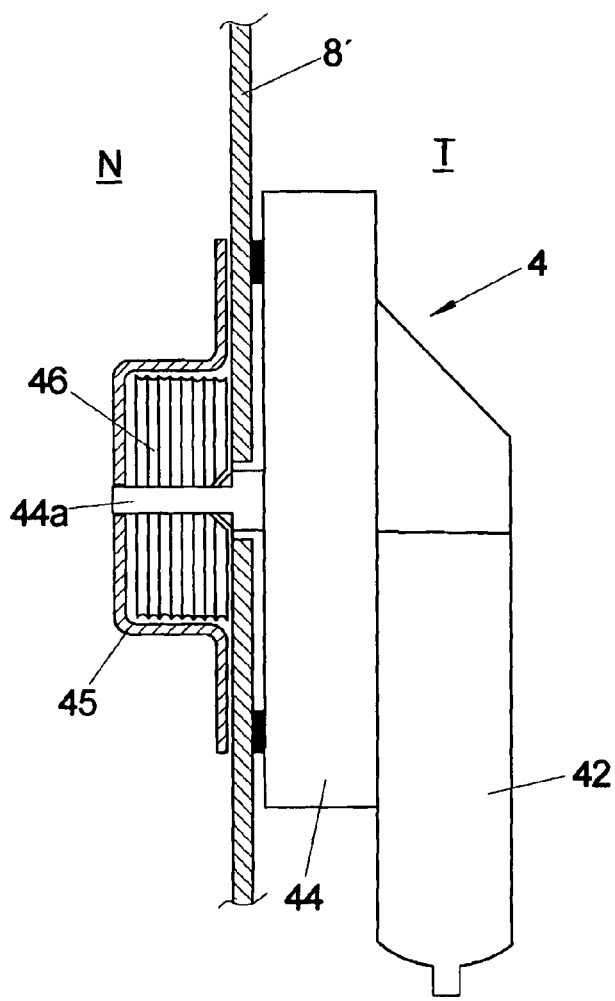
FIG. 15A shows a cross section through the adjusting system according to FIG. 15 in the region of the adjusting drive.

FIG. 15a shows a cross section through the adjusting system according to FIG. 15 in the region of the adjusting drive 4. It may be seen that the drive motor 42 and a motor-drive assembly 44 cooperating with the drive motor, are arranged in the so-called dry space T, i.e. in front of the surface of the connecting area 8' facing the vehicle interior. A drive shaft 44a of the motor-drive assembly 44 penetrates an opening in the connecting area 8' and is connected fixedly in terms of rotation to a cable drum 46 mounted on the wet space side N of the connecting area 8', i.e. the surface facing the outside of the vehicle. During operation of the drive motor 42, the drive shaft 44a, and the cable drum 46 are rotated so that a traction means Z wrapped around the cable drum, see FIG. 15, is actuated for positioning a window which may be adjusted by means of the window winder. The cable drum 46 is, therefore, received in a bearing cover 45 arranged on the connecting area 8'.

In the embodiment of an adjusting system according to FIG. 16 the structural unit formed by the first guide rail 1 and the lock support 10 is again connected integrally to a structural unit receiving the second guide rail 2 via a connecting area 8. The latter also carries the adjusting drive 4, which is secured via suitable fastening means 41 on the other side of the two guide rails 1, 2 adjacent to the second guide rail 2.

According to FIG. 16, the window winder is configured as a single-strand window winder, the single portion 140 of the traction means Z extended in the direction of adjustment z and provided with a carrier 14 extending along the guide rail 2 facing away from the lock.

The structural unit consisting of the first guide rail 1 and the lock support 10 thus also forms an interface for an external door handle holder 110.

FIG. 17 shows an adjusting system with a window winder with a so-called traveling adjusting drive 4 which is fastened to the lower window edge 3c of the window 3 to be adjusted via two tabs 47.

The adjusting drive 4 cooperates via a cable drum with a flexible traction means Z driven via the drive motor 42, for example in the form of a cable which is tightly clamped between two fastening points B1, B2 and extends in the direction of adjustment z of the window 3 to be adjusted. The two fastening points B1, B2 for the flexible traction means Z are provided on two arms S1, S2 which are integrally formed on the structural unit formed by a guide rail 1 and a lock support 10 and project therefrom, such that they extend in a direction x perpendicular to the direction of adjustment z as far as the adjusting drive 4, which is fastened in the central region of the lower window edge 3c. The upper arm S2 additionally has a further handle holder 125 for an internal door handle.

The two fastening points B1, B2, via which the flexible traction means Z is secured to the two arms S1, S2 of the structural unit comprising the guide rail 1 and the lock support 10, simultaneously also serve for fastening this structural unit to the motor vehicle bodywork, so that the adjusting forces arising on the traction means Z during operation of the window winder may be directly diverted into the door body.

FIG. 18 shows a further embodiment of the adjusting system with a single-strand window winder in which the structural unit formed from the first guide rail 1 and the lock support 10, integrally formed, comprises a receiving region 10a for the adjusting drive 4 of the window winder. Said adjusting drive drives a traction means, partially guided in a Bowden sheath 150, which extends with a portion 140 along the second guide rail 2 and is in engagement there with a carrier guided displaceably in the direction of adjustment z and positively guided on the second guide rail 2.

As the structural unit 1, 10, comprising the first guide rail 1, and the second guide rail 2 are merely connected to one another via the flexible traction means of the window winder guided in the Bowden sheath 150, the adjusting system shown in FIG. 18 is able to be folded up to save space for transportation.

Figure 19:
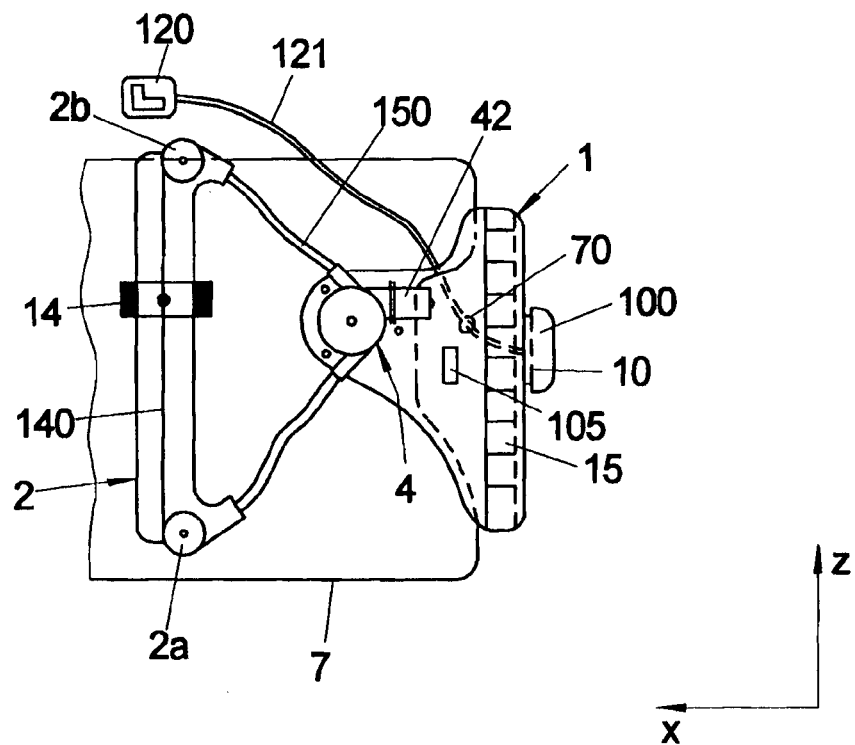
FIG. 19 are the adjusting system of FIG. 18 pre-assembled on an assembly support.
Figure 19A:
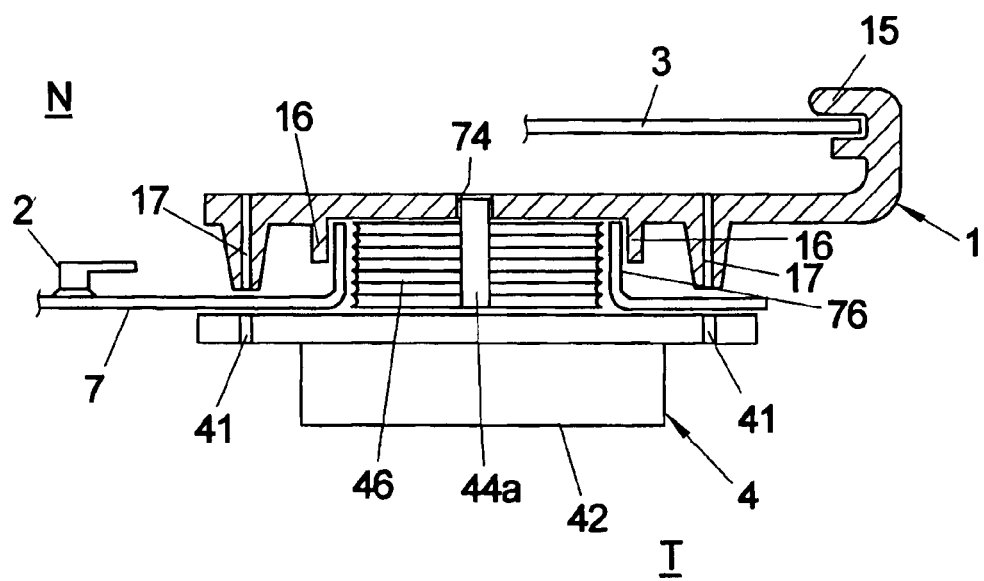
FIG. 19A shows a cross section through the adjusting system according to FIG. 19 in the region of the adjusting drive.

In FIGS. 19 and 19A an adjusting system of the type shown in FIG. 18 is shown in a state in which the structural unit comprising the first guide rail 1 and the lock support 10 and the second guide rail 2 are pre-assembled on an assembly support 7. In this connection, the structural unit comprising the first guide rail 1 and the lock support 10 projects partially laterally beyond the assembly support 7 and comprises a sealed opening 70 in the projecting region, through which the force transmitting element 121 connecting the door internal opener 120 to the door lock 100 is guided in the form of a Bowden cable (from the wet space into the dry space). Moreover, a connector strip 105 for the electrical connection of the door lock 100 is incorporated on that structural unit 1, 10.

With reference to FIG. 19A (cross-sectional view in the region of the adjusting drive 4), it is furthermore clear that the drive motor 42 of the adjusting drive 4, on the one hand, and a cable drum 46 driven by the drive motor 42, on the other hand, are arranged on different sides of the assembly support 7, namely on the one hand on its side facing the dry space T, and on the other hand on its side facing the wet space N. In this connection, a through-passage in the form of a hollow cylindrical portion 76 is formed on the assembly support 7 and serves to mount the cable drum 46, which is rotationally fixedly fastened to a drive shaft 44a which may be driven by the motor 42.

The structural unit comprising the guide rail 1 and the lock support 10, therefore, forms a bearing cover for the cable drum 46 with a bearing opening 74 for the drive shaft 44a, with a hollow cylindrical receiver 16 for the through-passage 76 of the assembly support 7 and with projections, which comprise fastening holes 17, which are aligned with fastening openings 41 for fastening the adjusting drive 4, which are provided on the side of the assembly support 7 facing away from the bearing cover on a fastening flange of the adjusting drive 4.

Furthermore, with reference to FIG. 19A it is clear that the second guide rail 2 is fastened as a separate component to the assembly support 7 and with a laterally angled portion forms a positive guide area for the carrier 14 (see FIG. 19).

In all illustrated embodiments of an adjusting system it is important that, before installation in a motor vehicle door, all components of the respective adjusting system may be combined into a pre-assembled structural group and therefore may be fully pre-tested, i.e. for example the function of the window winder by supplying current to the drive motor and the function of the closure system by testing the cooperation of the individual components of the closure system.

The invention claimed is:

1. An adjusting system for a door of a motor vehicle comprising:
   a window winder for adjusting a window in a direction of adjustment transverse to a longitudinal axis of the motor vehicle, the window winder comprising at least one force transmitting element and an adjusting drive, wherein the window is coupled to the adjusting drive with the force transmitting element, and wherein the adjusting drive is configured to move the window in the direction of adjustment with the force transmitting element to adjust the window in the direction of adjustment;
   a first guide area of the window winder for guiding the window along the direction of adjustment;

a door lock;

a lock support, the door lock configured to be pre-assembled on the lock support outside a motor vehicle door;

a second guide area of the window winder extending in the direction of adjustment of the window and positively engaged with a carrier being forcibly guided along the direction of adjustment;

wherein the first guide area of the window winder and the lock support are fixedly connected to one another, such that the first guide area and the lock support form a structural unit;

wherein the first guide area comprises at least one overlap area for a lateral window edge of the window to be adjusted; and wherein the second guide area is spaced transversely to the direction of adjustment from the first guide area.

2. The adjusting system of claim 1, wherein the first guide area and the lock support are connected directly to one another.

3. The adjusting system of claim 1 or 2, wherein the first guide area and the lock support are unreleasably connected to one another.

4. The adjusting system of claim 1, wherein the first guide area and the lock support are integrally formed with one another.

5. The adjusting system of claim 4, wherein the first guide area and the lock support are integrally formed by plastic injection-molding.

6. The adjusting system of claim 4, wherein the first guide area and the lock support are integrally formed by light metal casting.

7. The adjusting system of claim 1, wherein the structural unit comprises at least one part of a housing for the door lock.

8. The adjusting system of claim 1, wherein the structural unit comprises at least one part of a housing for the adjusting drive of the window winder.

9. The adjusting system of claim 1, wherein the structural unit comprises at least one part of a housing for a control unit.

10. The adjusting system of claim 1, wherein the structural unit carries at least one of the following:
an external handle holder;
a door internal opener;
a cover for the door lock;
the first guide area;
the adjusting drive for the window winder;
a control unit for at least one of the window winder and the lock;
electrical conductors for at least one of a power supply and signal transmission;
a sensor system for at least one of the window winder and the lock;
a protection device configured to protect against moisture; and
fastening elements for fixing a functional component to the structural unit.

11. The adjusting system of claim 10, wherein the fastening elements are clip elements.

12. The adjusting system of claim 1, wherein the first guide area of the window winder and the lock support are connected to one another via a deformable region, so that the position of the lock support is configured to be varied relative to the guide area by deforming the deformable region for tolerance compensation.

13. The adjusting system of claim 12, wherein the first guide area and the lock support are connected to one another via a flexible region.

14. The adjusting system of claim 12, wherein the first guide area and the lock support are connected to one another via an integrally formed deformable region.

15. The adjusting system of claim 1, wherein the structural unit comprises fixing elements to temporarily fix at least one of the following for secure transportation:
a door internal opener;
the adjusting drive for the window winder;
a control unit for at least one of the window winder and the lock;
electrical conductors for at least one of a power supply and signal transmission; and
the second guide area for the window winder.

16. The adjusting system of claim 1, wherein the window winder is configured as a single-strand window winder with just one force transmitting element longitudinally extended in the direction of adjustment of the window to be adjusted, and wherein the force transmitting element is configured to transmit an adjusting torque produced by the adjusting drive onto the window to be adjusted.

17. The adjusting system of claim 1, wherein the window winder is configured as a double-strand window winder comprising two force transmitting elements longitudinally extended parallel to one another and wherein the force transmitting elements are configured to transmit a drive torque produced by the adjusting drive onto the window to be adjusted.

18. The adjusting system of claim 1, wherein the at least one force transmitting element is configured as a flexible force transmitting element.

19. The adjusting system of claim 18, wherein the at least one force transmitting element is one of a cable and a flexible element of screw-shaped configuration.

20. The adjusting system of claim 1, wherein the at least one force transmitting element is configured as a rigid force transmitting element.

21. The adjusting system of claim 20, wherein the at least one force transmitting element is one of a toothed rack and a spindle.

22. The adjusting system of claim 1, further comprising a carrier configured to be moved in the direction of adjustment by a force transmitting element arranged along at least one of the guide areas of the window winder.

23. The adjusting system of claim 22, wherein the carrier displaceably engages in the associated guide area in the direction of adjustment.

24. The adjusting system of claim 22, wherein the carrier is loosely guided along the associated guide area.

25. The adjusting system of claim 1, wherein the first guide area of the window winder carries a deflection device configured to deflect a flexible traction device.

26. The adjusting system of claim 25, wherein the deflection device comprises deflection pulleys.

27. The adjusting system of claim 25, wherein the deflection device comprises sliding elements.

28. The adjusting system of claim 27, wherein the sliding elements are integrally formed on an associated guide area.

29. The adjusting system of claim 25, wherein the deflection device is pre-assembled on the associated guide area and connected directly to a door body.

30. The adjusting system of claim 1, wherein the first guide area comprises a plurality of overlap areas arranged one after the other in the direction of extension of the first guide area.

31. The adjusting system of claim 1, wherein a carrier is loosely guided along the first guide area combined with the lock support into a structural unit.

32. The adjusting system of claim 1, wherein a carrier is positively engaged with the second guide area of the window winder extended in the direction of adjustment of the window, and is forcibly guided along the direction of adjustment of the window to be adjusted.

33. The adjusting system of claim 1, wherein the second guide area is arranged closer to a center of gravity of the window than the first guide area.

34. The adjusting system of claim 33, wherein the second guide area consists of a material with a greater load bearing capacity than the first guide area.

35. The adjusting system of claim 34, wherein the second guide area consists of metal and the first guide area consists of plastics.

36. The adjusting system of claim 33, wherein the second guide area is arranged such that it carries between 60% and 80% of the window weight and wherein the first guide area is arranged such that it carries between 20% and 40% of the window weight.

37. The adjusting system of claim 33, wherein the adjusting drive is arranged adjacent to an upper end of the second guide area.

38. The adjusting system of claim 1, wherein the second guide area comprises at least one overlap for a lateral window edge of the window to be adjusted.

39. The adjusting system of claim 1, wherein at least one of a motor and a control unit of the adjusting drive is arranged on a side of a mounting plate associated with an interior of a motor vehicle, wherein at least one of the motor and the control unit is configured to close a mounting hole in a door inner skin of a motor vehicle door.

40. The adjusting system of claim 1, wherein the first and second guide areas are configured as two toothed racks and arranged on a common assembly support.

41. The adjusting system of claim 40, wherein a gear wheel is engaged with a longitudinal toothed portion of each of the two toothed racks extended in the direction of adjustment, wherein during a rotational movement of each gear wheel, each gear wheel is moved along a respectively associated longitudinal toothed portion, such that the gear wheels are driven by a common motor, and wherein the motor is connected to the window to be adjusted.

42. The adjusting system of claim 40, wherein a gear wheel is engaged with a longitudinal toothed portion of each of the two toothed racks extended in the direction of adjustment of the window, wherein during a rotational movement of each gear wheel, each gear wheel is moved along a respectively associated longitudinal toothed portion, and wherein each of the gear wheels is driven by a separate motor, wherein the window to be adjusted is driven in the direction of adjustment during a longitudinal movement of the gear wheels.

43. The adjusting system of claim 40, wherein a gear wheel is engaged with a longitudinal toothed portion of each of the two toothed racks extended in the direction of adjustment of the window, and
wherein the gear wheels are mounted on a respective carrier connected to the window to be adjusted.

44. The adjusting system of claim 1, wherein the window winder comprises a spindle extending along each guide area, and a spindle nut corresponding to each spindle and rotatably guided and movably guided in the direction of adjustment.

45. The adjusting system of claim 44, wherein a motor is associated with each spindle nut to drive the respective associated spindle nut.

46. The adjusting system of claim 44, wherein each spindle nut is connected by a respective carrier to the window to be adjusted.

47. The adjusting system of claim 1, wherein the adjusting drive is a common drive to both the window winder and the door lock, and wherein the adjusting drive is switchable between the window winder and the door lock.

48. The adjusting system of claim 1, wherein the window winder comprising the at least one force transmitting element and the adjusting drive, the first guide area, the door lock, the lock support, and the second guide area are configured to be completely pre-assembled before installation in a motor vehicle door.

49. The adjusting system of claim 48, wherein electrical and mechanical functions of the window winder comprising the at least one force transmitting element and the adjusting drive, the first guide area, the door lock, the lock support, and the second guide area are configured to be tested before the installation thereof in a motor vehicle door.

50. The adjusting system of claim 1, wherein the window winder comprising the at least one force transmitting element and the adjusting drive, the first guide area, the door lock, the lock support, and the second guide area are configured to be pre-assembled on an assembly support outside a motor vehicle door.

51. The adjusting system of claim 50, wherein the assembly support consists of metal.

52. The adjusting system of claim 50, wherein the assembly support consists of plastics.

53. The adjusting system of claim 50, wherein a portion of at least one of the window winder comprising the at least one force transmitting element and the adjusting drive, the first guide area, the door lock, the lock support, and the second guide area is integrally formed on the assembly support.

54. The adjusting system of claim 53, wherein at least one of the first and second guide areas of the window winder is integrally formed on the assembly support.

55. The adjusting system of claim 1, wherein the first guide area and the second guide area are connected to one another via a connecting area.

56. The adjusting system of claim 55, wherein the connecting area carries the adjusting drive of the window winder.

57. The adjusting system of claim 55, wherein the connecting area is configured to be connected via a plug connection to a structural unit formed by a guide area and the lock support and to the second guide area.

58. The adjusting system of claim 55, wherein a structural unit is connected by an integrally formed connecting area to the second guide area.

59. The adjusting system of claim 1, wherein the structural unit comprises a receiving region for receiving the adjusting drive.

60. The adjusting system of claim 1, wherein the second guide area is combined with the adjusting drive into a pre-assembled module.

* * * * *